United States Patent
Sorvari et al.

(10) Patent No.: US 7,580,363 B2
(45) Date of Patent: Aug. 25, 2009

(54) APPARATUS AND METHOD FOR FACILITATING CONTACT SELECTION IN COMMUNICATION DEVICES

(75) Inventors: Antti Sorvari, Itasalmi (FI); Markus Kahari, Helsinki (FI); Hannu Toivonen, Helsinki (FI); Jukka-Pekka Salmenkaita, Espoo (FI); Catalin Gheorghiu, Espoo (FI)

(73) Assignee: Nokia Corporation, Espoo (FI)

( * ) Notice: Subject to any disclaimer, the term of this patent is extended or adjusted under 35 U.S.C. 154(b) by 898 days.

(21) Appl. No.: 10/919,020

(22) Filed: Aug. 16, 2004

(65) Prior Publication Data

US 2006/0035632 A1    Feb. 16, 2006

(51) Int. Cl.
*H04J 1/16* (2006.01)
*H04J 3/14* (2006.01)

(52) U.S. Cl. ...................................... 370/252
(58) Field of Classification Search ................. 455/557, 455/418
See application file for complete search history.

(56) References Cited

U.S. PATENT DOCUMENTS

| | | | | |
|---|---|---|---|---|
| 6,072,875 A | * | 6/2000 | Tsudik | 380/270 |
| 6,240,402 B1 | * | 5/2001 | Lynch-Aird | 705/400 |
| 2003/0040850 A1 | | 2/2003 | Najmi et al. | |
| 2004/0043758 A1 | | 3/2004 | Sorvari et al. | |
| 2004/0148392 A1 | * | 7/2004 | Cotte | 709/225 |
| 2004/0177108 A1 | * | 9/2004 | Connelly et al. | 709/201 |
| 2005/0020316 A1 | * | 1/2005 | Mahini | 455/566 |
| 2005/0054381 A1 | | 3/2005 | Lee et al. | |

FOREIGN PATENT DOCUMENTS

| | | |
|---|---|---|
| JP | 2002-135399 | 5/2002 |
| WO | WO04021613 | 3/2004 |

OTHER PUBLICATIONS

Yu et al., "Improved Name Recognition with User Modeling", published 2003.
Nokia 3620 User'Manual, "Nokia Connecting People" pp. table of contents and 26-30, 2003.

* cited by examiner

*Primary Examiner*—Ajit Patel
(74) *Attorney, Agent, or Firm*—Hollingsworth & Funk, LLC

(57) ABSTRACT

An apparatus and method for facilitating user selection of communication recipients via communication devices. Communication attributes of previous communication events involving the communication device are monitored. Selection criteria are established based on the monitored communication attributes. One or more adaptive recipient history lists are maintained, which correspond to contacts that are affiliated with the communication events satisfying the selection criteria. At least one of the adaptive recipient history lists are presented to the user via the communication device, thereby allowing the user to select the intended recipient via more relevant, focused short lists of likely recipients.

41 Claims, 10 Drawing Sheets

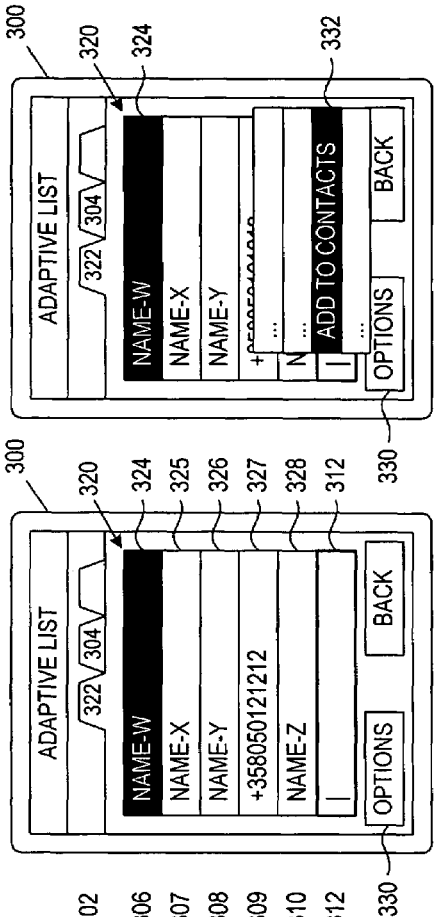
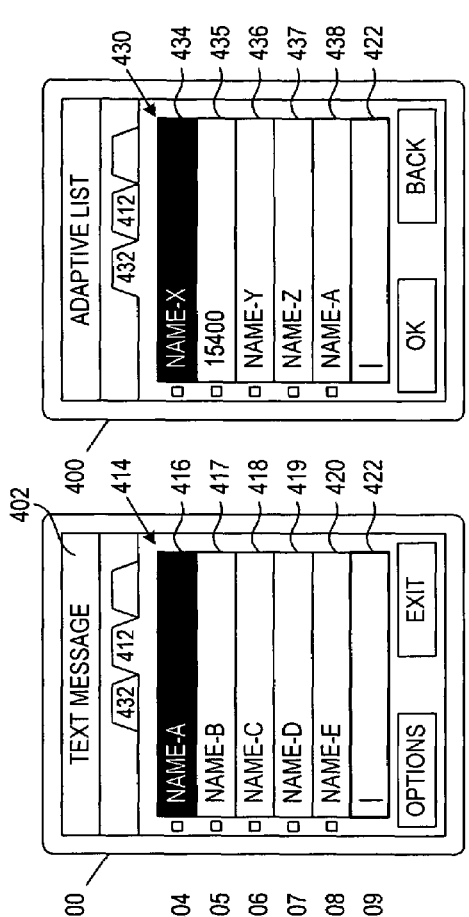
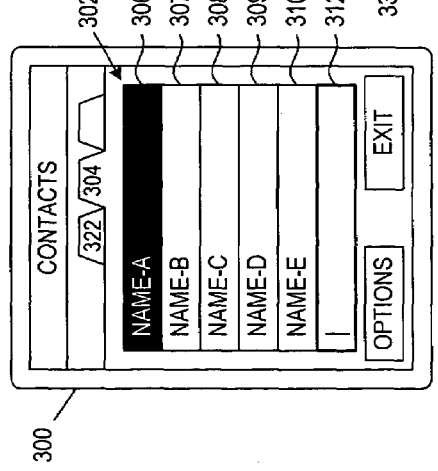
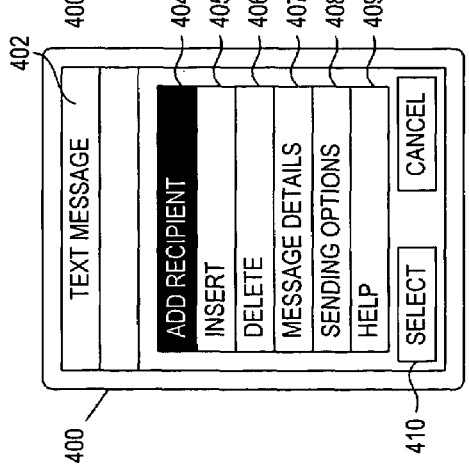

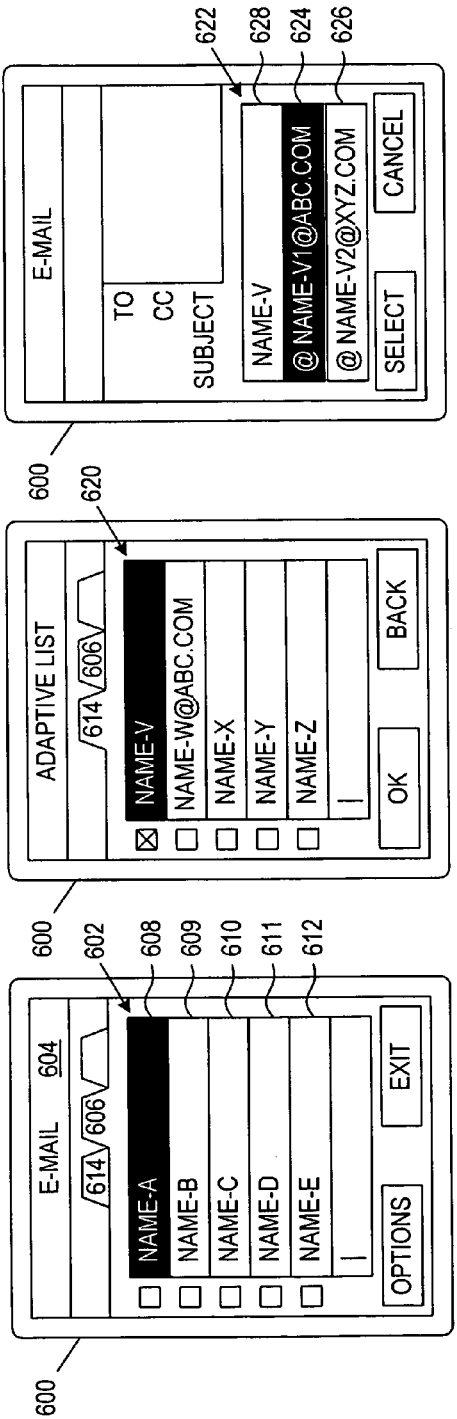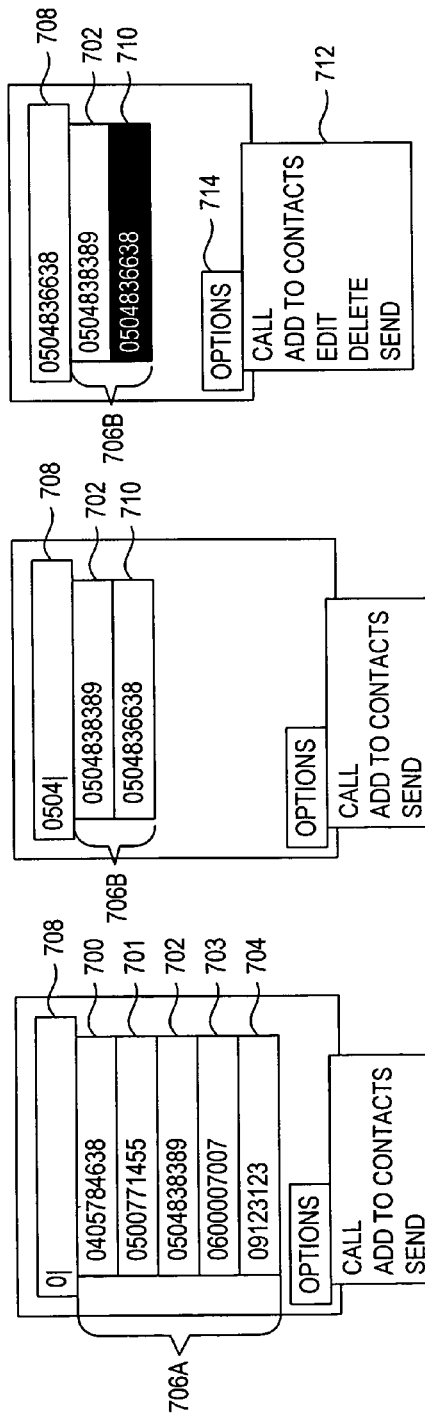

US 7,580,363 B2

APPARATUS AND METHOD FOR FACILITATING CONTACT SELECTION IN COMMUNICATION DEVICES

FIELD OF THE INVENTION

The invention relates generally to communications, and more particularly to an apparatus and method for facilitating user selection of communication recipients via communication devices.

BACKGROUND OF THE INVENTION

Technological advances in communication infrastructures and protocols have turned standard computing devices into valuable communication tools. Computers communicate with each other, and with other electronic devices, over networks ranging from Local Area Networks (LANs) to wide reaching Global Area Networks (GANs) such as the Internet. Other electronic devices have experienced similar transformations, such as mobile phones, Personal Digital Assistants (PDAs), and the like. Today, these wireless devices are being used for a variety of different types of communication. For example, current mobile phone and PDA technologies have transformed these wireless devices into powerful communication tools capable of communicating voice, text or other data, documents, images, video and other multimedia content (generally referred to herein as communications).

PDAs, once the portable calendaring and organizational tool, now often include network communication capabilities such as e-mail, Internet access, etc. Conversely, mobile phones and other traditional communication devices now often include local applications such as calendars, phonebooks or other contact lists, task lists, and other organizational tools. Tools such as contact lists assist the communication device user with placing voice calls and/or directing electronic messages to intended recipients of the communications. For example, a local contacts application can be accessed by the communication device user to help the user recollect contact addresses or other identifiers, and can provide the user with a platform from which contacts can be directly designated as intended recipients of a new communication.

More particularly, when initiating voice calls, text/multimedia/e-mail messages or other communications, the user has various options to enter the address or other identifier of the recipient. For example, the user may directly enter the recipient's landline telephone number, mobile phone number, text or multimedia address, e-mail address, etc. This numeric, alpha, or alphanumeric entry can be tedious, especially for mobile users where user interface mechanisms are smaller due to limited device sizes, and because mobile users may be driving an automobile or in another situation where text entry is inconvenient. In order to reduce the number of keystroke entries required, as well as to obviate the need for users to recall recipient addresses from memory, communication devices often provide such a contact application to allow various recipient communication addresses to be stored and later retrieved.

While such a stored contact list may be useful to the user, particularly to avoid the need for the user to remember the contact addresses, it may not significantly reduce the number of required keystroke entries or navigational manipulations to search for and select the intended recipients. For example, a user who has a large number of stored contacts may need to enter a significant portion of the targeted recipient's name to present the desired recipient. Further, even where the presented contact list shortens due to entry of a portion of the targeted recipient's name, the user may still need to scroll to the correct entry. While it may be more convenient for a user to locate a targeted recipient in this manner relative to directly entering the recipient address, the search for the targeted recipient in the contact list may involve a significant number of user interface (UI) manipulations, whereby the purported user-friendly aspect of such a contact list may be frustrated. This is particularly inefficient for certain types of communications such as messaging (e.g., Short Message Service, Multimedia Messaging Service, etc.), where it is possible that only a small portion of the total contacts includes such a messaging address. For example, the user's contact list may contain hundreds of contacts, but only a small number of those contacts include a relevant address for engaging in the desired communication type. Further, a majority of messages are sent to a small number of recipients. In these cases, the user still needs to filter through all of the contacts to locate the targeted user(s), who may be among only a small subset of the contacts to which the desired communication could be sent.

Accordingly, there is a need for a manner of providing more relevant, focused lists of contacts from which the user can select the desired recipient(s). The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses an apparatus and method for facilitating user selection of communication recipients via communication devices.

In accordance with one embodiment of the invention, a method is provided for presenting relevant contact identifiers for selection by a user of a communication device. One or more communication attributes of previous communication events involving the communication device are monitored. These monitored communication attributes may include, for example, contact identifiers, indications of incoming and/or outgoing communications, communication types, call durations, time elapsed from previous communication of a similar type, message type (e.g., new message, reply, forward, etc.), or the like. Selection criteria are established, based on the monitored communication attributes. One or more sets of selectable contact identifiers or "adaptive lists" are maintained, which correspond to contacts that are affiliated with the communication events satisfying the selection criteria. At least one of the sets of selectable contact identifiers is presented to the user via the communication device. According to a more particular embodiment, a computer-readable medium having computer-executable instructions stored thereon is provided for performing such a method.

According to more particular embodiments of such a method, establishing selection criteria involves establishing one or more weighting factors based on the monitored communication attributes. This may involve specifying a frequency of the communication events for each of the contacts that are affiliated with the communication events, where maintaining the set(s) of selectable contact identifiers includes maintaining an adaptive recipient history list(s) corresponding to the contacts that are affiliated with the communication events that correspond to the specified frequency in which these communication events occur. The frequency in which these communication events occur may be based on all communication events, or a subset thereof based on particular communication attributes such as the communication type. For example, an adaptive list may be based on the frequency of a text messaging communication type, a multimedia messaging communication type, voice call communication type, or others, including any combination thereof. Analogous embodiments involve weighting factors based on how recently the communication device was involved in such communications. Many other weighting factors are possible, such as whether the user "missed" or otherwise failed to recognize a communication, whether the communication is to or from a contact associated with a pre-existing group, etc. The weighting factors may be weighted relative to one another, to provide a relative priority therebetween. Further, such weighting factors may be fixed, such as at the time of manufacture or provisioning, or may be designated by the user.

According to other particular embodiments of the method, establishing selection criteria may include establishing a "context" in which one or more of the communication events occurred, where maintaining the set(s) of selectable contact identifiers involves maintaining an adaptive recipient history list(s) that is affiliated with the communication events occurring within the established context. For example, this context may involve a location, date, time, event, a particular day, etc.

According to still other particular embodiments of such a method, user entry of a portion of a contact identifier may be allowed, where one or more sets of selectable contact identifiers (e.g., adaptive lists) may be used as a basis for auto-completion of the user entry of the contact identifier. For example, the user may enter a portion of a contact identifier, and the possible matches to that portion of the contact identifier are taken from the adaptive lists, or at least those possible matches are presented first to the user. Contact identifiers in the list are eliminated as the user enters more characters, if those contact identifiers no longer match the portion entered by the user. This adaptive list auto-completion feature may be performed via an idle screen of the communication device, via any of the communication applications themselves, or otherwise. For example, where the adaptive list auto-completion feature is performed via a communication application (e.g., text or multimedia messaging application, telephony application, etc.), the user may enter the portion of the contact identifier into a "To" field, and the adaptive list may be presented proximate the "To" field.

According to other particular embodiments, presenting at least one of the sets of selectable contact identifiers involves presenting the set(s) of selectable contact identifiers such that a portion or all of the set(s) of selectable contact identifiers can be perceived by the user at a given instant. As an example, the presented set of selectable contact identifiers may be visually presented to the user only a portion at a time, such as where the number of contact identifiers in the set does not reasonably fit on a display screen of the communication device. Alternatively, the set of selectable contact identifiers may be presented to the user in its entirety.

In accordance with another embodiment of the invention, a method is provided for presenting relevant contact identifiers for selection by a user of a communication device. The method includes monitoring one or more communication attributes of previous communication events involving the communication device, and establishing selection criteria based on the monitored communication attributes. One or more sets of contact identifiers corresponding to contacts that are affiliated with the communication events that satisfy the selection criteria are maintained. The method further includes facilitating entry of voice-entered (e.g., spoken) contact identifiers, and generating a plurality of possible contacts corresponding to the voice-entered contact identifiers. At least one of the sets of contact identifiers is combined with the generated plurality of possible contacts to create a set of selectable contact identifiers. The set of selectable contact identifiers is then presented to the user via the communication device, either audibly, visually, or both. According to a more particular embodiment, a computer-readable medium having computer-executable instructions stored thereon is provided for performing such a method.

In accordance with another embodiment of the invention, a communication device is provided. The communication device includes a memory to store selection criteria, such as the weighting factors and/or the context in which the communications occur. The communication device includes an adaptive list engine, which in one embodiment is implemented via a processor(s) and associated software and/or firmware. The adaptive list engine is configured to monitor communication attributes of communication events involving the communication device, and to maintain one or more adaptive lists of contact identifiers corresponding to contacts that are affiliated with the communication events satisfying the selection criteria. A user interface is provided to present the adaptive lists of contact identifiers to the user, and to facilitate user selection of one or more of the contact identifiers as intended recipients of a current communication.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of method and apparatuses in accordance with the invention.

BRIEF DESCRIPTION OF THE DRAWINGS

The invention is described in connection with the embodiments illustrated in the following diagrams.

FIGS. 3A-3C illustrate representative user interface (UI) displays of adaptive lists of dialed numbers according to one embodiment of the invention;

FIGS. 4A-4C illustrate representative UI displays of adaptive lists of text messaging contacts according to one embodiment of the invention;

FIGS. 6A-6C illustrate representative UI displays of adaptive lists of e-mail contacts according to one embodiment of the invention;

FIGS. 7A-7C depict representative UI screens illustrating an idle state auto-completion of a contact address entry according to one embodiment of the invention;

DETAILED DESCRIPTION OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

It is often the case that communication device users communicate with certain people or entities (i.e. contacts) more often than they communicate with others. While a collective contact list or electronic "phonebook" is helpful as a tool to store contact information, it does not always represent a user-friendly or expedient way to specify a contact to which a current communication is intended. Further, while current technology may provide for a communication activity log, such a log does not take into account the dynamic nature of the communication attributes, nor does it propose particular contacts to the user that are most likely to be used by users initiating further communications. These represent just a few of the shortcomings of prior art contact lists and activity logs that are used with today's communication devices.

Generally, the present invention provides a manner of creating one or more adaptive lists of "relevant" contacts, which represent contacts to which the user is more likely to initiate a communication. These adaptive lists may include a single collective list of one or more "popular" or otherwise potentially relevant contacts, or may include a plurality of such lists separated by communication type or other attributes. By presenting to the user one or more lists of contacts that are more likely to be targeted recipients of a current communication, searching, scrolling, typing and/or other navigational manipulations are reduced, thereby providing the device user with the ability to quickly make selections from a focused list of probable communication recipients.

Figure 1:
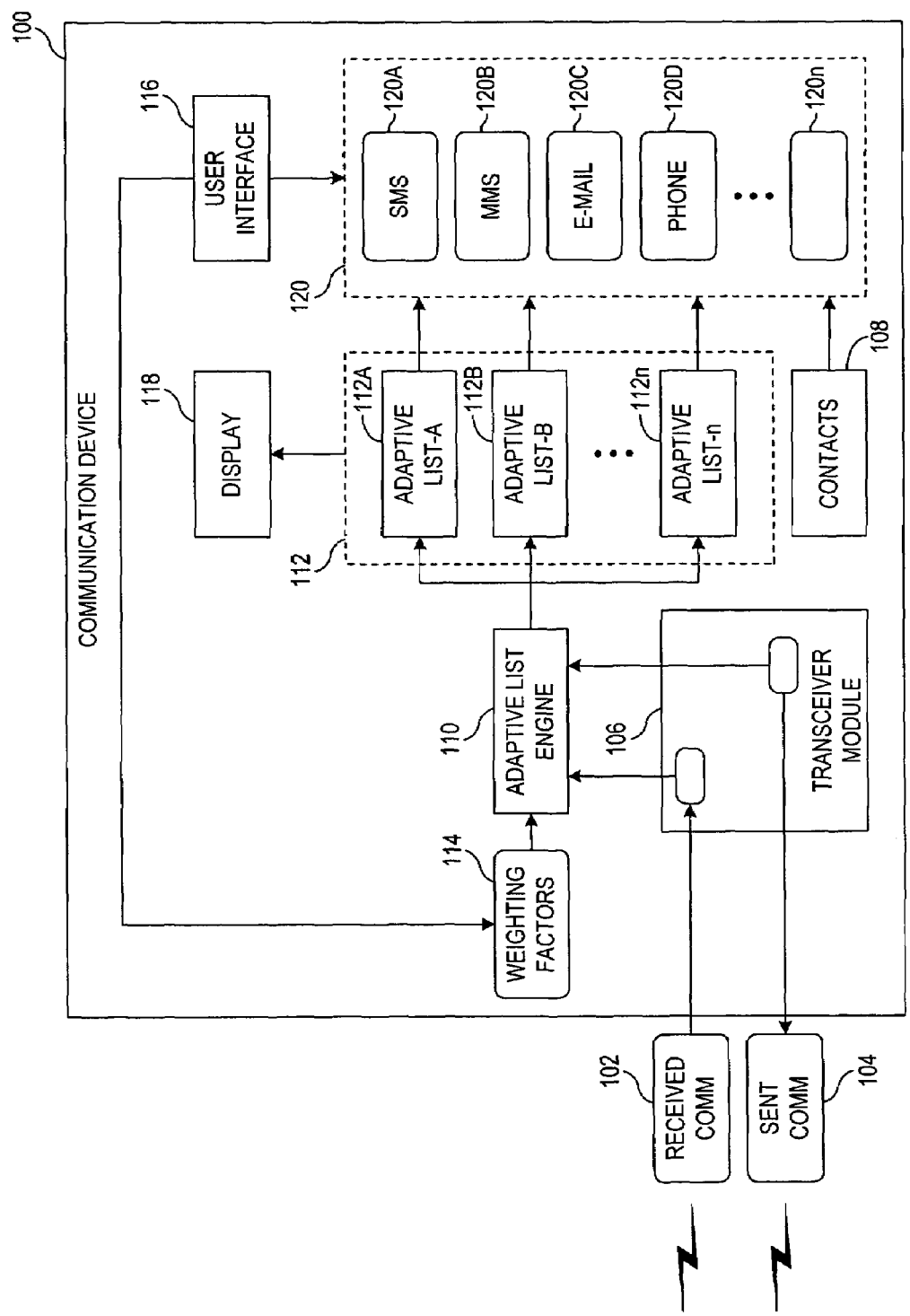
FIG. 1 is a block diagram illustrating one embodiment of a manner for providing one or more adaptive recipient history lists in accordance with the present invention.

FIG. 1 is a block diagram illustrating one embodiment of a manner for providing one or more adaptive recipient history lists in accordance with the present invention. A communication device 100 is provided, which includes any electronic device capable of performing voice communication and/or messaging such as electronic mail (e-mail), Short Message Service (SMS), Multimedia Messaging Service (MMS), and/or any other type of voice, text, multimedia messaging. The communication device 100 may represent desktop or other landline computing devices, or mobile devices such as, for example, mobile phones, Personal Digital Assistants (PDAs), portable computers and the like.

The communication device 100 may engage in voice communication and/or messaging to communicate with other communication devices. For example, the communication device 100 may receive voice calls and/or messages from recipients, as depicted by the received communication (COMM) 102. The communication device 100 may transmit voice calls and/or messages to a recipient(s) as depicted by the sent communication 104. Each sent and/or received communication represents a communication event that involves the communication device. In the illustrated embodiment, the communication device 100 is represented as a mobile device capable of wireless communication with one or more networks. The illustrated communication device 100 includes a transceiver module 106, which may include one or more transmitters, receivers, and/or transceivers to send and receive the communications. For example, the transceiver module 106 may include a transceiver for communicating voice calls over a cellular network, and/or messages such as SMS, MMS, e-mail, or other messages over various networks.

When placing voice calls or initiating text/multimedia/e-mail messages (hereinafter generally referred to as "messages"), the user has various options to enter the call/message address of the recipient(s). For example, the user may directly enter the recipient's landline telephone number, mobile phone number, SMS/MMS number or address, e-mail address, etc. This numeric, alpha, or alphanumeric entry can be tedious, especially for mobile users where user interface mechanisms are smaller due to limited device sizes, and because mobile users may be driving an automobile or in another situation where text entry is inconvenient. In order to reduce the number of keystroke entries required, as well as to obviate the need for users to recall recipient addresses from memory, communication devices often provide a contact application 108 that allows various recipient communication addresses to be stored and later retrieved.

While the stored contacts may be quite useful to the user, particularly to avoid the need for the user to remember the contact addresses, it may not significantly reduce the number of keystroke entries or "clicks" on the device. For example, a user who has a large number of stored contacts may need to enter a significant portion of the targeted recipient's name to present the desired recipient. Further, even where the presented contact list shortens due to entry of a portion of the targeted recipient's name, the user may still need to scroll to the correct entry. While it may be more convenient for a user to locate a targeted recipient in this manner relative to directly entering the recipient address, the search for the targeted recipient in the contact list may involve a significant number of user interface (UI) manipulations, whereby the purported user-friendly aspect of such a contact list may be frustrated. This is particularly inefficient for certain types of communications such as messaging (e.g., SMS, MMS, etc.), where it is possible that only a small portion of the contacts includes such a messaging address. For example, the user's contact list may contain hundreds of contacts, but only a small number of those contacts include an MMS address for engaging in MMS communications. In these cases, the user still needs to filter through all of the contacts to locate the targeted user, who may be among only a small subset of the contacts to which an MMS communication could be sent.

In accordance with the present invention, an adaptive list engine(s) 110 is provided to address these and other issues involving locating targeted recipient addresses. The adaptive list engine 110, which may be implemented in hardware, firmware, software, or any combination thereof, is coupled to receive contact information relating to recipient communications 102 and/or sent communications 104, and possibly other sources. The adaptive list engine 110 can create one or more adaptive recipient history lists 112, which serve as a "short list" of more probable targeted recipients from which the user can make a selection to address a communication(s).

In one embodiment, a single adaptive recipient history list 112 may be provided which includes the relevant contact identifiers (e.g., addresses, names, etc.) regardless of the type of communication involved. For example, a subset of the received and/or sent communications 102, 104 may be associated with contact addresses or other identifiers deemed relevant by the adaptive list engine 110, which are then maintained as an adaptive recipient history list 112 from which the user can select targeted communication recipients. Such a list may include different types of contact addresses or communication types, such as voice/telephone numbers and messaging numbers or Uniform Resource Identifiers (URIs). In another embodiment, different communication types may be grouped together. For example, a first adaptive recipient history list may be provided for the most relevant voice/telephone numbers, and a second adaptive recipient history list may be provided for the most relevant messages including SMS, MMS, and e-mail. In still other embodiments, an adaptive recipient history list may be provided for each of the SMS, MMS, e-mail, or other communication types.

More particularly, the illustrated embodiment of FIG. 1 depicts a plurality of adaptive recipient history lists, labeled adaptive list-A 112A, adaptive list-B 112B, through some indeterminate number of adaptive lists depicted by adaptive list-n 112n. Adaptive list-A 112A may provide, for example, the adaptive recipient history list for voice/telephone contacts that meet certain criteria for placing those contacts on the list 112A. Adaptive list-B 112B may provide, for example, the adaptive recipient history list for all messaging (e.g., SMS, MMS, e-mail, etc.) contacts that meet certain criteria for placing those contacts on the list 112B. Alternatively, the different messaging types may be separated into individual adaptive recipient history lists, such that there is an SMS adaptive recipient history list, an MMS adaptive recipient history list, an e-mail adaptive recipient history list, and so forth. Any desired groupings and/or number of adaptive recipient history lists may be implemented in accordance with the present invention. These adaptive recipient history lists will provide a more focused list of contacts that are deemed of relevance to the user for that communication type or group of communication types.

The adaptive list engine 110 makes decisions whether to place a contact address on an adaptive recipient history list based on selection criteria, which may be designated in advance and/or determined dynamically. Such selection criteria in accordance with the embodiment illustrated in FIG. 1 includes the weighting factors 114. Weighting factors may be fixed on the mobile device, such as at the time of manufacture, at provisioning, etc. Alternatively, or in addition, weighting factors may be programmed or otherwise designated by the user, as indicated by the input to the weighting factors 114 from the user interface 116.

Any desired weighting factors 114 relating to communication attributes may be implemented to assist in the selection of information to associate with a particular adaptive recipient history list(s). For example, the frequency in which a particular contact address is sent and/or received may be used to determine whether that contact address is to be placed on an adaptive recipient history list. As a more particular example, a weighting factor 114 may include the collective number of times that a particular contact address is received or targeted, whereby the adaptive list engine 110 computes this number and updates the particular adaptive recipient history list(s) accordingly. A number of the most frequently received/sent contact addresses may then form the adaptive recipient history list. Such a weighting factor based on the frequency in which a particular contact address is the initiator and/or the recipient of a communication may or may not be limited to a particular time period. For example, one weighting factor may involve calculating the total number of times in which a particular contact is the initiator and/or recipient of communications, where in another embodiment it may involve calculating the number of times in which the particular contact is the initiator and/or recipient of communications during a particular time, such as in a week, month, etc.

Other representative examples of communication attributes that may be used as weighting factors 114 include how recently a communication involving a contact was sent/received; whether an incoming call or message was missed (i.e. not answered or otherwise perceived) by the user; whether the communication was a sent or received communication; whether the user has manually designated a contact (s) to be forced onto an adaptive recipient history list; whether the contact(s) is part of an established "group" of contacts (e.g., family); call duration (e.g., zero or near-zero length calls may be neglected in some embodiments); message type (e.g., new message, reply, forward, etc.); time elapsed from previous communications of a certain type(s) (e.g., if the user makes several calls to the same number during a short period of time it could affect the adaptive list differently compared to when more time passes between calls), etc. These are merely examples of various weighting factors 114 provided for purposes of facilitating an understanding of such weighting factors, and the present invention is clearly not limited to the representative examples specified herein. Further examples of selection criteria and/or communication attributes are described below.

When one or more adaptive recipient history lists 112 has been established, the appropriate list(s) 112 may be presented to the user via a display 118. The list(s) 112 may be presented upon user request, or may be presented in response to some user action. For example, a list 112 may be presented when the user invokes a corresponding communication module 120. In another embodiment, the user requests that an adaptive recipient history list(s) be presented, such as by selecting the appropriate menu item, UI button/mechanism, link, etc. Various examples are described more fully in the ensuing description.

It should further be noted that "presenting" the list(s) 112 involves providing the list(s) 112 such that they are available for use by the user, even though the entire list(s) 112 is not immediately visible or otherwise perceivable to the user. For example, a presented list 112A may include ten relevant contact identifiers, but only five of the contact identifiers are visually displayed on the display 118 at a time. Other portions of the list 112A may be manually or automatically perceived by the user if and when necessary or desired, such as by scrolling, etc. Thus, as used herein, presenting a list(s) may involve presenting the list(s) such that all or a portion of the list(s) is perceivable by the user at a given time.

In operation, the user of the communication device 100 may invoke a communication module 120. These communication modules 120 include various applications for facilitating the desired communication type. Such applications may include any one or more of an SMS application 120A, MMS application 120B, e-mail application 120C, telephone (phone) application 120D, and/or any voice, text, video, conferencing, multimedia, or other application 120n involving recipient communication addresses. Either before, in connection with, or after invoking the desired communication module(s) 120, the appropriate adaptive recipient history list 112 may be presented to the user via the display 118.

For example, the user may invoke an SMS application 120A via the user interface (UI) 116. This may be invoked in any conventional manner, including but not limited to pressing a button(s) or activating other mechanisms, selecting the application 120A via a graphical menu, voice commands, or the like. In one embodiment, the user selects the appropriate UI mechanism to present the adaptive recipient history list corresponding to SMS recipients. This adaptive recipient history list may be limited to the "relevant" SMS recipients as determined by the adaptive list engine, or may be included with other communication types such as MMS, e-mail, etc. Using the UI 116, the user may then select the targeted recipient(s) of the communication, and the message is sent to the selected recipient(s) via the transceiver module 106. It should be recognized that the adaptive recipient history list may be presented via the display 118, and/or via other UI mechanisms such as via audio. In an audio embodiment, the items in the adaptive recipient history list may be audibly presented to the user, who in turn may select the desired recipient(s) using voice commands, entering a number/letter corresponding to the desired recipient(s), etc.

In another embodiment, the user may first access the adaptive recipient history list, and select the desired recipient(s). When the recipient(s) has been selected, the user may then invoke the desired communication module 120. For example, the user may access an adaptive recipient history list that presents the relevant contacts for MMS messaging, and may select one or more of the contacts from this list. Through further UI manipulations, or automatically, the MMS application 120B may then be presented to the user, with the selected contact(s) in the "To" field or other addressee field of the MMS message.

In one embodiment, the adaptive recipient history list 112 is designed to gracefully co-exist with a phonebook or other contact application 108. Thus, if the desired recipient is not "short-listed" on any of the one or more adaptive recipient history lists, the user can readily access the contact application 108. For example, a link may be presented in connection with an adaptive recipient history list to allow the user to quickly access the contact application 108 in the event that the desired recipient(s) is not associated with an adaptive recipient history list.

Thus, one aspect of the present invention involves the use of one or more adaptive recipient history lists, which represent one or more short lists of adaptive, relevant contact information. The lists are adaptive in that they can change based on monitored communication attributes, e.g., weighting factors and/or other selection criteria.

Figure 2:
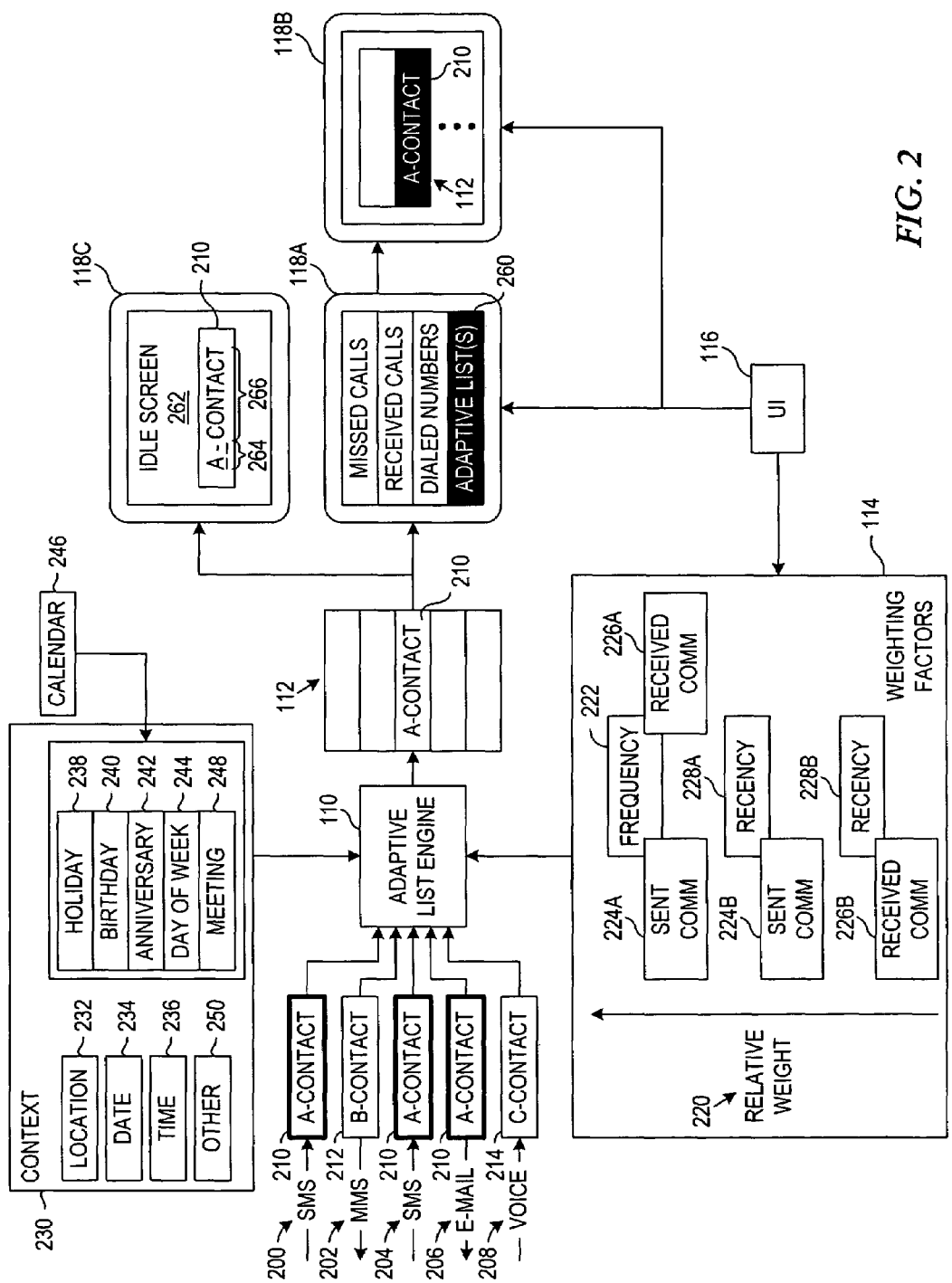
FIG. 2 is a block diagram of a more particular embodiment of a manner for providing a particular adaptive recipient history list in accordance with the present invention.

FIG. 2 is a block diagram of a more particular embodiment of a manner for providing a particular adaptive recipient history list in accordance with the present invention. In the illustrated embodiment, like reference numbers to those described in connection with FIG. 1 are used where appropriate. Various communications are sent and received at the adaptive list engine 110. Received communications include the SMS messages 200, 204 from a first contact labeled A-Contact 210, as well as a voice communication 208 from the C-Contact 214. Sent communications include the MMS message 202 to the B-Contact 212, and the e-mail communication 206 to the A-Contact 210. Other communications may be involved, and those illustrated in FIG. 2 are provided for purposes of explanation only.

The contact addresses associated with the sent and/or received communications are processed by the adaptive list engine 110, in order to generate one or more adaptive recipient history lists 112. In the illustrated embodiment, only one adaptive recipient history list 112 is illustrated, although others may also be generated by the adaptive list engine 110. The adaptive list engine 110 determines which of the contact addresses are to be placed on or otherwise associated with the adaptive recipient history list 112. In one embodiment, one or more weighting factors 114 are used by the adaptive list engine 110 to assist in this determination. As shown by the UI 116, one or more of the weighting factors 114 may be initially and/or dynamically provided by the user.

The weighting factors 114 may be provided equal weights, or may be provided relative weights with respect to one another. While any desired relative weights may be selected, the embodiment of FIG. 2 illustrates a representative example of the relative weight 220 that may be applied to various weighting factors 114. The example of FIG. 2 illustrates an increasing relative weight from bottom to top, and thereby creates relative priorities of the various weighting factors. The highest weight in this embodiment relates to the frequency 222 of communications, and provides equal weight to both sent communications (COMM) 224A and received communications 226A. Therefore, the frequency 222 in which a particular contact address(es) is the sender or the intended recipient is considered by the adaptive list engine 110 in generating the adaptive recipient history list 112, and in the illustrated embodiment constitutes a primary weighting factor 114.

As a more particular example, the frequency 222 of contact involvement may include determining whether a particular contact(s) was involved in communications with the mobile device at least a predetermined minimum number of times. For example, if a particular contact initiates or is the recipient of communications at least ten times, the contact will be included on the corresponding adaptive recipient history list(s). This can also be extended to the situation where the contact initiates and/or is the recipient of communications a predetermined number of times in a predetermined time period, such as five times within one week. This "contact frequency" may be determined by maintaining a cumulative total of each contact that initiates or is the recipient of communications, and those contacts having the highest cumulative number will be placed on the corresponding adaptive recipient history lists. The contact frequency may also be determined by introducing a time variable to the cumulative contact count. In such a case, the recorded contact count for a particular contact may be decremented from time-to-time if the contact has not initiated or been the targeted recipient of a communication for a predetermined time period. In this manner, a contact that at an earlier time had been involved often, but is no longer involved often, will eventually lose its "strength," thereby giving way to more recently involved contacts to be associated with the adaptive recipient history list(s). For example, if a particular contact had been involved (e.g., initiator and/or recipient) ten times (i.e., contact count equals 10) a month ago, but has not been involved since, the storage strength of the contact may be diluted by decrementing the contact count (ten) by one for every day, week, or other predetermined period that the contact is not involved. As a more particular example, and assuming contact count decrementing by one for each week that the contact is not involved, the contact count would decrease from ten to six in four weeks if the contact had not been involved during that time. Therefore, a new contact that had been involved seven times could supplant this contact on the adaptive recipient history list(s). In addition to calendar-based or time-based embodiments, contact counts may be decremented based on the number of events that have occurred. For example, when a contact is involved in a communication event, its count or "score" may be increased, and/or all other contact counts/scores may be decreased. The count/score may or may not be an integer value.

An analogous embodiment includes storing a predetermined number of the most recently involved contacts, whether or not they are the most frequently used. For example, the five most recently involved contacts may be associated with the adaptive recipient history list(s), and the "oldest" of the contacts on the adaptive recipient history list(s) may be removed to accommodate a more recently involved contact. In the illustrated embodiment, the next highest weight relates to such recency 228A of sent communications 224B, followed by the recency 228B of received communications 226B. Thus, the representative example provides the highest weight to higher frequency contact addresses (whether sent or received), followed by the contact addresses of the most recent sent communications, and finally by the contact addresses of the most recently received communications.

In accordance with one embodiment of the invention, context-awareness can be implemented to the basic adaptivity. By adding context-awareness, the one or more of the results ultimately presented to the user may be dependent on the user's present context and/or the context of previously performed actions. Thus, the adaptive list engine 110 considers the user's context 230 in some embodiments of the invention. For example, the context 230 may include, but is not limited to, any one or more of a location 232, date 234, and/or time 236. As a more particular example, if the time 236 is after business hours, the adaptive list engine 110 may place a greater emphasis on personal contact addresses than business contact addresses, where the contacts are categorized as such.

Another example involving location 232 may similarly place a different emphasis on the processing of the adaptive list engine 110 depending on the user's location. For example, if the user is at work, a greater emphasis may be placed on business contacts, while a greater emphasis may be placed on personal contacts when the user is at home. If the user is shopping, a greater emphasis may be placed on commercial contacts, such as restaurants, shops, and the like. The location 232 may include either or both of the user's current location, or a location at which the user was when a previous action was performed. For example, if the last time the user was at a particular location the user called one or more particular contacts, those contacts may be associated with the adaptive recipient history list 112 the next time the user visits that location.

The user's location may be determined in any known fashion. For example, any appropriate wireless signal technology may be employed, such as Bluetooth, Wireless Local Area Network (WLAN), Radio Frequency Identification (RFID), or other local positioning or short-range wireless communication technology. As a more particular example, a Bluetooth-enabled mobile device may recognize that it is at the user's work location due to the presence of a Bluetooth access point or "hot spot" that notifies the mobile device of its present location. Wider range wireless communication technologies maybe used for larger areas where appropriate, including any telecommunication network-based positioning system. This can include, for example, a cellular network itself, whereby a cell-ID, Location Area Code (LAC), and/or other location identifier can be used to identify the current cellular area of the mobile device. Global System for Mobile Communication (GSM) and other location technologies may also be used.

Another exemplary context that may be considered by the adaptive list engine 110 involves specific days or dates. For example, the adaptive list engine 110 may provide a greater emphasis for contact addresses categorized as personal contacts on holidays 238. Particular contacts may be given precedence when a birthday 240, anniversary 242 or other special day occurs. Other days, such as particular days of the week 244 also provide a context that may be considered by the adaptive list engine 110. For example, the adaptive list engine 110 may provide a greater weight to personal contacts on weekends, while providing greater weight to business contacts during the working week. These dates may be programmed into the device, and/or may be accessed through cooperation with a local or remote calendar application 246. Using such a calendar 246 application, other context-awareness possibilities also exist, such as providing a greater weight to certain business contacts prior to and/or during a meeting time scheduled on the user's calendar 246. For example, a scheduled meeting with a known contact may, for a predetermined time prior to and during a scheduled meeting, be provided a greater weight by the adaptive list engine 110, since the probability of the user contacting a meeting attendee may be higher during that time. Any other 250 desired context parameter may be used as well, and the examples of FIG. 2 are provided for purposes of facilitating an understanding of this aspect of the invention.

Based on weighting factors 114 and/or the context 230 of the user, the adaptive list engine 110 generates one or more adaptive recipient history lists 112. For purposes of ease of description, it is assumed that a single adaptive recipient history list 112 is generated by the adaptive list engine 110, although multiple adaptive recipient history lists may be generated as previously described. The A-Contact 210 was involved in communications with the user a number of times, including the incoming SMS messages 200, 204, and the outgoing e-mail 206. Where frequency of communication is a relevant weighting factor 114, the adaptive list engine 110 may then generate an adaptive recipient history list 112 that includes the contact address for the A-Contact 210. The generated adaptive recipient history list 112 is presented to the user, such as via the user's device display 118A. Using menus or other graphical, mechanical, or audio mechanisms, the user may select the adaptive lists option 260, whereby the adaptive recipient history list 112 is presented via the display 118B to the user which includes the A-Contact 210. Alternatively, the user may be automatically presented with the adaptive recipient history list 112 when invoking a particular communication application (e.g., telephone application, text/multimedia messaging application, e-mail application, etc.). In any case, the user may then simply choose the desired recipient from the adaptive recipient history list 112. This may be performed in any known manner, such as scrolling to the desired A-Contact 210 and selecting it, or using other UI 116 mechanisms.

The display 118C may also present an idle screen 262, from which a user can initiate the entry of contact addresses. In one embodiment, auto-completion of the contact address entry is supported via the idle screen 262 of the display 118C, where the adaptive recipient history list 112 serves as the basis for the auto-completion. In this embodiment, at least those contacts maintained in the adaptive recipient history list 112 are available for auto-completion of contact address entries. For example, the user may have ten contacts with the same family name of LASTNAME, but only one of those contacts are present on the adaptive recipient history list 112. When the user starts entering the contact name/address from the idle screen 262 (or other similar screen where such entry may be made), the name is auto-completed based on the contact addresses in the adaptive recipient history list 112. Using the example of FIG. 2, the user may enter the first one or more characters 264 for the A-Contact 210 which is present in the adaptive recipient history list 112. Because the contact is listed on the adaptive recipient history list 112, the remaining portion 266 of the contact name/address is completed automatically, thereby allowing the user to quickly access the intended recipient.

In order to facilitate an understanding of various aspects of the invention, a number of representative examples of adaptive recipient history lists (also referred to as "adaptive lists") are now described. FIGS. 3A-3C illustrate representative user interface (UI) displays of adaptive lists of dialed numbers. FIG. 3A illustrates a display 300 of a standard contacts list 302. The list 302 may be presented in response to various user actions, such as selecting a graphical contacts tab 304. The contact list 302 includes a plurality of contact entries, some or all of which are presented in the viewable area of the display 300. In the illustrated embodiment, the contact entries 306-310 represent a viewable subset of the total set of contacts associated with the contact list 302. In order for the user to identify a desired contact(s) in which to direct a telephonic communication, the user must scroll to the desired contact(s), enter a portion or all of the contact identifier in the text entry field 312, or perform other searching functions. As previously described, entering or searching for the desired contact(s) can involve burdensome manipulations in some cases.

To ease the user's ability to locate a desired telephonic communication recipient quickly, an adaptive list 320 of dialed numbers may be presented on the display 300 as shown in FIG. 3B. The adaptive list 320 may be selected from the contact list 302 view by selecting the tab 322, or via other UI operations. The adaptive list 320 may also be presented in response to a predetermined action, such as the user invoking the telephone application on the device. Further, such an adaptive list 320 may also be visible from other UI screens, such as a communication log screen that presents a list of all communications involving the mobile device, and/or from particular communication applications. More particular examples are provided below.

The adaptive list 320 includes a subset of the total set of contacts associated with the contact list 302, where the subset of contacts 324-328 represents a potentially relevant list of contacts from which the user can make a selection. As previously described, the adaptive list engine determines which contacts are to be associated with the adaptive list 320, based on weighting factors and/or context-awareness. For example, the adaptive list 320 may represent the most frequently, recently, and/or most popular dialed numbers from which the user can make a selection(s).

In accordance with one embodiment of the invention, the adaptive list 320 may present only a number of contacts 324-328 that can fit in a single display 300 window. In this manner, no scrolling beyond what is displayed is required, thereby allowing the user to quickly determine whether the desired recipient(s) is on the adaptive list 320. In another embodiment, a greater number of contacts may be associated with the adaptive list 320 that will fit on a single display 300 window. In such an embodiment, the user can scroll or otherwise navigate through the adaptive list 320, or may enter all or a portion of the recipient contact name/address in the text entry field 312. While this embodiment may involve some user navigation and/or character entry, is will generally be much less than what would be required with the full contact list 302.

The contacts 324-328 provided via the adaptive list 320 may be presented using the names or other contact identifiers from the contact list 302 provided by the corresponding contact application. Alternatively, the sent and/or received contact identifiers may be directly presented to the adaptive list 320 without reference to a contact application. For example, using technologies such as Caller Line Identification (CLI) service, the telephone number, contact name, and/or other contact identifier may be provided to the mobile device. More particularly, CLI (also known as caller ID) generally refers to a service supplied by many phone providers, where the phone number is transmitted when the phone call is made. With a CLI-equipped receiving terminal, the user can see the phone number of the caller before answering the call. Multimedia CLI (MCLI) refers to CLI where multimedia content accompanies the phone number, or is provided in lieu of the phone number. For example, a digital picture of the caller may be transmitted, and/or an audio clip, graphics, corporate logo, and/or the like. These and similar technologies may be used to supply the contact identifiers in the adaptive list 320, or other adaptive recipient history lists in accordance with the present invention. Where such technologies are used, the contact identifiers in the adaptive list 320 may optionally be added to the primary contact list associated with the contact application. For example, a menu, button, or other UI mechanism may be provided to allow the user to add any one or more of the contacts 324-328 associated with the adaptive list 320 to the primary contact list 302. One example is shown in FIG. 3C, Where the graphical options button 330 includes an option 332 to add a highlighted contact(s) from the adaptive list 320 to the contact list 302. More particularly, the user may select the options button 330, which presents one or more options, including the option 332. By selecting option 332, the highlighted or otherwise selected contact 324 may be added to the contact list.

Thus, prior to dialing, the present invention makes possible for the end user to select the intended recipient(s) from a quickly accessible short list that is automatically maintained based on previous incoming and/or outgoing contact identifiers. In one embodiment, the adaptive list(s) co-exists with the contact/phonebook application, in the event that the intended recipient is not "short listed." For example, if the intended recipient(s) is not provided via the adaptive list 320, the user can simply click the tab 304 or other link to navigate to the contact list 302. Other manners for navigating to the contact list 302 from the adaptive list 320 may be used instead, or in addition to such a tab 304, such as using links, menus, voice commands, mechanical buttons, etc. The adaptive list engine behind the adaptive list 320 may maintain more numbers than are shown via the UI display 300.

FIGS. 4A-4C illustrate representative UI displays of adaptive lists of text messaging contacts, such as SMS contacts. The adaptive lists relating to such SMS contacts are similar to the telephone contacts described in connection with FIGS. 3A-3C. FIG. 4A illustrates a display 400 showing available options in connection with invoking a text messaging application. For example, the user may invoke an SMS or other text messaging application that presents a text message screen 402. The user may select an options button (not shown) or other UI mechanism to present the user with the ability to add one or more recipients as targeted recipients of the text message. In the illustrated embodiment, the items 404-409 illustrate representative selectable options presented in response to the user requesting presentation of such options through the text messaging application. One option is the "add recipient" option 404. The user can select this option 404 by, for example, highlighting the option 404 and activating the graphical select button 412. In response, a standard contacts list 414 may be presented as shown in FIG. 4B, similar to the contacts list 304 described in connection with FIG. 3A. The contact list 414 includes a plurality of contact entries, some of which are presented in the viewable area of the display 400. In the illustrated embodiment, the contact entries 416-420 represent a viewable subset of the total set of contacts associated with the contact list 414. In order for the user to identify a desired contact(s) in which to direct a telephonic communication, the user must typically scroll to the desired contact(s), enter a portion or all of the contact identifier in the text entry field 422, or perform other searching functions.

To ease the user's ability to locate a desired text message recipient quickly, an adaptive list 430 of text message contact identifiers may be presented on the display 400 as shown in FIG. 4C. The adaptive list 430 may be selected from tab 432, or via other UI operations. The adaptive list 430 includes a subset of the total set of contacts associated with the contact list 414. This subset of contacts 434-438 represents a potentially relevant list of text messaging contacts as provided by the adaptive list engine, from which the user can make a selection. As with any of the adaptive lists, only a number of contacts that can fit in a single display 400 window may be associated with the adaptive list 430, or a greater number of contacts may be associated with the adaptive list 430 than will fit on a single display 400 window. Where necessary, the user can scroll or otherwise navigate through the adaptive list 430, or may enter all or a portion of the recipient contact name/address in the text entry field 422.

Thus, prior to entering a text message contact or address, the present invention allows the user to select the intended SMS or other text messaging recipient(s) from a quickly accessible short list that is automatically maintained based on previous incoming and/or outgoing text messages. Again, the adaptive list 430 may co-exist with the contact/phonebook application, in the event that the intended SMS recipient is not "short listed." Further, the adaptive list can also be combined with the normal contact list so that, for example, the top three (or other number) of adaptive list contacts are shown on top of the list, and the remaining contacts in the list could be shown in alphabetical order or other desired order.

Figure 5A:
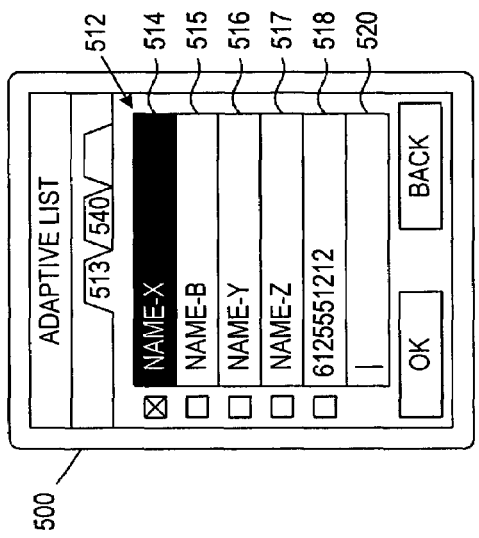
FIGS. 5A-5D illustrate representative UI displays of adaptive lists of multimedia messaging contacts according to one embodiment of the invention.
Figure 5C:
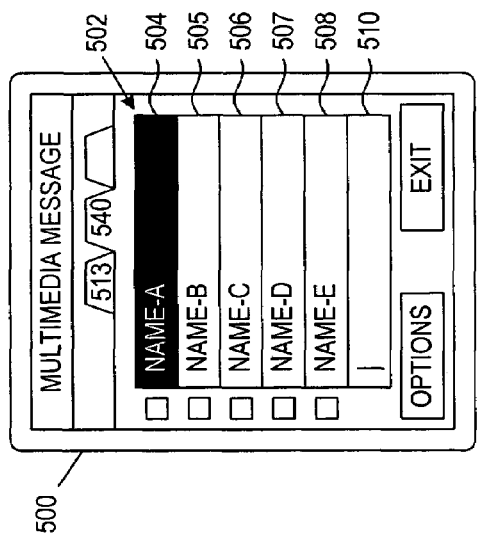
Figure 5B:
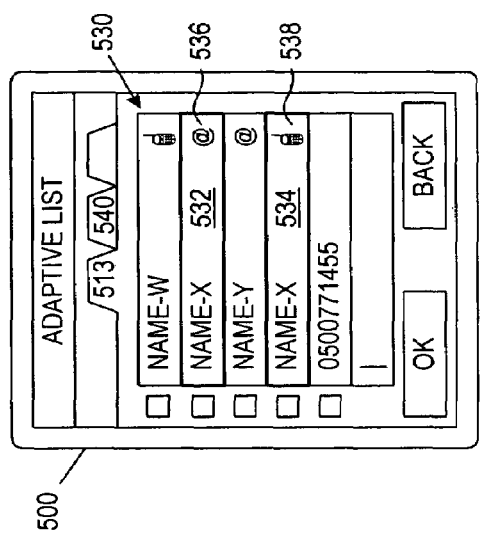

FIGS. 5A-5D illustrate representative UI displays of adaptive lists of multimedia messaging contacts, such as MMS contacts. In accordance with one embodiment of the invention, MMS adaptive lists may be created and maintained in a manner similar to SMS adaptive lists, such as described in connection with FIGS. 4A-4C. For example, FIG. 5A illustrates a display 500 showing available options in connection with invoking a multimedia messaging application. By way of UI actions, the user may cause the device to present a standard contacts list 502 that includes a plurality of contact entries, some of which are presented in the viewable area of the display 500. In the illustrated embodiment, the contact entries 504-508 represent a viewable subset of the total set of contacts associated with the contact list 502. The user typically identifies a desired contact(s) by scrolling to the desired contact(s), entering a portion or all of the contact identifier in the text entry field 510, or performing other searching functions. In accordance with the present invention, an adaptive list 512 of multimedia message contact identifiers may be presented on the display 500 as shown in FIG. 5B. The adaptive list 512 may be selected from tab 513 or by way of other UI operations. The adaptive list 512 includes a subset of the total set of contacts associated with the contact list 502. This subset of contacts 514-518 represents a potentially relevant list of multimedia messaging contacts as provided by the adaptive list engine, from which the user can make a selection. Again, only a number of contacts that can fit in a single display 500 window may be associated with the adaptive list 512, or a greater number of contacts may be associated with the adaptive list 512 than will fit on a single display 500 window. Where necessary, the user can scroll or otherwise navigate through the adaptive list 512, or may enter all or a portion of the recipient contact name/address in the text entry field 520.

In one embodiment, selection of a contact(s) from the adaptive list 512 presents multiple contact options for the selected contact(s). An example of such an embodiment is illustrated in FIG. 5C. Upon selection of a contact(s) from the adaptive list 512, the multimedia message screen 522 may be presented. To provide the user with options to contact the selected recipient via other communication types, a recipient communication screen 524 may be presented to allow the user to select another desired communication type, such as a mobile phone number 526 or e-mail address 528.

Figure 5D:
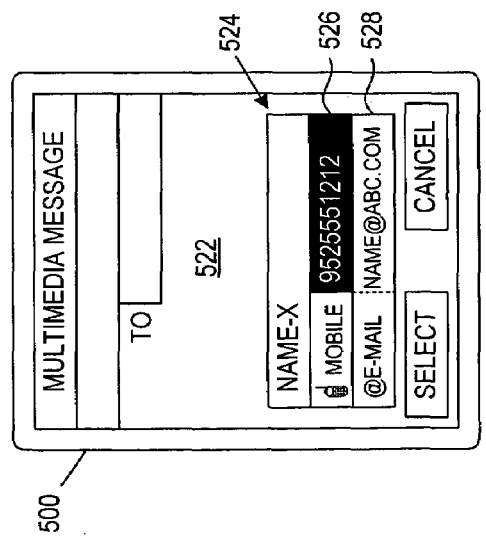

An alternative embodiment for the adaptive list 512 of FIG. 5B is shown in FIG. 5D, which presents adaptive list 530. In this embodiment, a separate line for each contact and communication type is provided. For example, the particular contact labeled NAME-X is presented two times, once for an e-mail address and once for a mobile phone number. More particularly, NAME-X contact field 532 indicates the e-mail address for NAME-X, and NAME-X contact field 534 indicates the mobile phone number for NAME-X. These different communication types for a common contact may be distinguished from one another in various manners. One such manner is to provide icons or other graphical indicia, such as the e-mail icon 536 and the mobile phone icon 538. Text, audio, or other manners of distinguishing common contact names may also be used to identify the communication types, and/or different addresses of the same communication type. As in the previous examples, the user may quickly and easily navigate to the standard contact list via any appropriate UI mechanism, such as through the use of tab 540.

FIGS. 6A-6C illustrate representative UI displays of adaptive lists of e-mail contacts. The e-mail embodiment of FIGS. 6A-6C is similar to the MMS embodiment of FIGS. 5A-5C, except that the adaptive list is e-mail specific in the illustrated embodiment. The display 600 of FIG. 6A allows the standard contact list 602 to be presented via the e-mail application 604, such as by selecting contact tab 606. The contact entries 608-612 represent a viewable subset of the total set of contacts associated with the contact list 602. By selecting the adaptive list tab 614 or by using another UI mechanism as shown in FIG. 6B, the e-mail adaptive list 620 is presented on the display 600. If more than one e-mail address is available for a particular contact, they may all be presented via the adaptive list 620 using distinguishing text, graphics, etc. Alternatively, the particular contact may be presented once via the adaptive list 620, and upon selection of the particular contact, a recipient communication screen 622 may be presented as shown in FIG. 6C. This allows the user to select among a plurality of e-mail addresses for the selected contact, as shown by the multiple e-mail addresses 624, 626 for the contact labeled NAME-V 628.

As previously indicated, one embodiment of the invention involves idle state auto-completion. Thus, auto-completion of the contact address entry is supported via an idle screen or other predetermined screen(s) of the display, where the adaptive recipient history list serves as the basis for the auto-completion. FIGS. 7A-7C depict representative UI screens that illustrate such an idle state auto-completion. Referring first to FIG. 7A, a number of contacts 700-704 associated with the adaptive list 706A are displayed. The user begins entering characters in the text entry field 708. As the user enters more characters of the contact address, some of the contacts 700-704 are eliminated, as not matching the character string currently entered in the text entry field 708. This is depicted in FIG. 7B, where the string "0504" is entered in the text entry field 708, resulting in two remaining contacts. The contact 702 was displayed in the viewable area of the adaptive list 708 shown in FIG. 7A, while contact 710 was not displayed in the viewable area until some of the contacts 700-704 were eliminated.

In accordance with one embodiment, the adaptive list 706B of FIG. 7B continues to present the contacts 702, 710 according to the weighting factors and/or context as processed by the adaptive list engine. For example, where weighting factors are provided to present the adaptive list 706A/B according to the contacts exhibiting the highest communication frequency, the reduced list of contacts in the adaptive list 706B is presented in a decreasing order of communication frequency from top to bottom. This allows the user to scroll to the most frequently used contact with the fewest keystrokes or other UI manipulations, even as the list of contacts in the adaptive list 706B changes due to the elimination of contacts that do not match the character string in the text entry field 708. If and when the user eventually stops entering text in the text entry field 708 and selects a contact such as contact 710, the text entry field 708 is updated to reflect the contact identifier of the selected contact, as shown in FIG. 7C. A number of options 712 may be presented for user selection, which may be presented upon user selection of the graphical options button 714 or other UI mechanism.

Figures 8A, 8B, 8C:
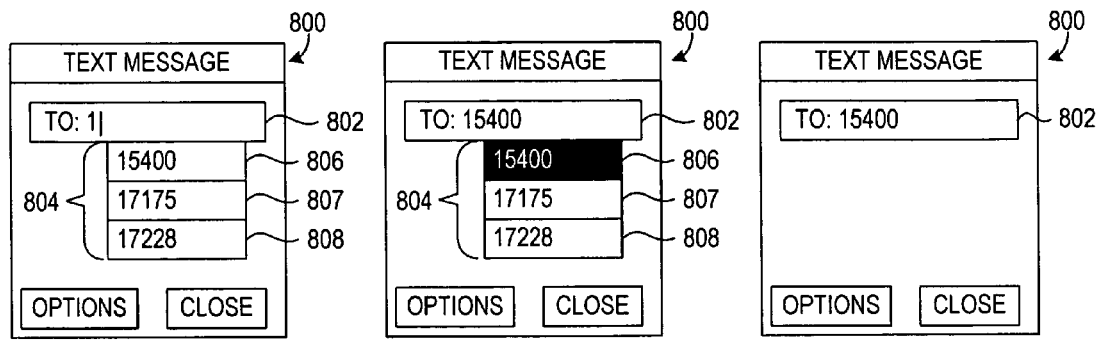
FIGS. 8A-8C depict representative UI screens that illustrate an auto-completion embodiment made available from a text messaging application according to one embodiment of the invention.

Auto-completion may be performed in connection with communication applications rather than, or in addition to, idle screen auto-completion. FIGS. 8A-8C depict representative UI screens that illustrate an auto-completion embodiment made available from a text messaging (e.g., SMS) application. Referring first to FIG. 8A, a UI screen 800 includes a text entry field 802 in which a user begins entering a desired contact identifier(s). In the illustrated embodiment, the user has entered a "1", which eliminates other contacts associated with the SMS/text messaging adaptive list, resulting in a subset 804 of an adaptive list that includes only those contact identifiers 806-808 of the adaptive list that begin with the numeral "1." As the user enters more characters of the contact address, more of the contacts 806-808 are eliminated, for failing to match the character string currently entered in the text entry field 802. The changing adaptive list represented by the subset 804 continues to present the associated contact identifiers according to the weighting factors and/or context as processed by the adaptive list engine. At any time, the user may switch to scrolling or other selection mode to highlight or otherwise designate one or more of the remaining contacts 806-808 as intended recipients of the SMS/text messaging communication. This is depicted in FIG. 8B, where the user has highlighted contact identifier 806. When the contact identifier 806 is selected, the text entry field 802 is updated to reflect the selected contact identifier 806. The user may also select multiple contacts from the adaptive list subset 804 by using known UI mechanisms. The user may then select this contact identifier from the text entry field 802 to designate the corresponding contact as an intended recipient of the text message, as shown in FIG. 8C.

Figures 9A, 9B:
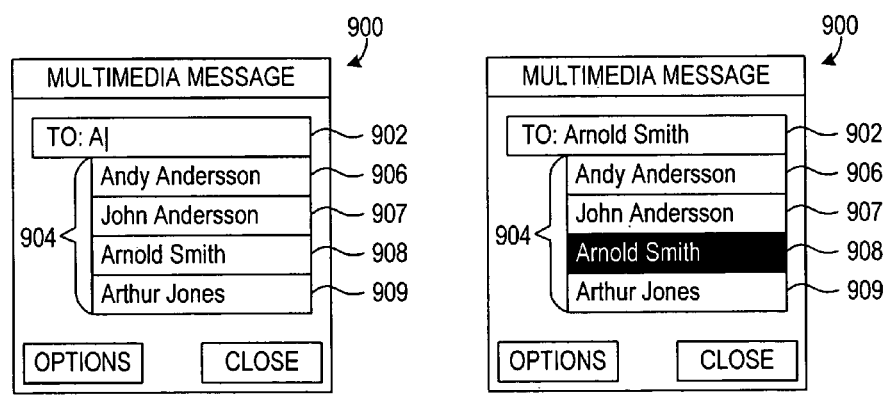
FIGS. 9A-9B illustrate various representative embodiments of MMS/e-mail auto-completion using contact names in accordance with the present invention.

The embodiment of FIGS. 8A-8C also applies to MMS, e-mail, or other communication types. For example, adaptive list auto-completion for MMS numbers may be performed in a manner analogous to that described in connection with FIGS. 8A-8C. The contact identifiers may be represented by identifiers other than numbers, such as e-mail addresses, contact names, or other addresses, aliases, etc. FIGS. 9A-9B illustrate various representative embodiments of MMS/e-mail auto-completion using contact names in accordance with the present invention.

Referring to FIG. 9A, a multimedia UI screen 900 includes a text entry field 902 in which a user begins entering a desired contact identifier(s). While the embodiment of FIG. 9 refers to multimedia contacts, the embodiment is equally applicable to other messaging such as e-mail. In the illustrated embodiment, the user has entered an "A", which eliminates other contacts associated with the multimedia messaging adaptive list, resulting in a subset 904 of an adaptive list that includes only those contact identifiers 906-909 of the adaptive list that begin with the letter A/a. If the user enters more characters of the contact address, more of the contacts 906-909 are eliminated for failing to match the character string currently entered in the text entry field 902. In one embodiment, a match of either the first or last name of the contact (e.g., John Andersson, Arnold Smith) may be matched in order to present the name as part of the subset 904 of the adaptive list. In other embodiments, either the first or last name, or other predetermined name portion(s) may be the name portion to which a match is determined.

At any time, the user may switch to scrolling or other selection mode to highlight or otherwise designate one or more of the remaining contacts 906-909 as intended recipients of the messaging communication. This is depicted in FIG. 9B, where the user has highlighted contact identifier 908. When the contact identifier 908 is selected, the text entry field 902 is updated to reflect the selected contact identifier 908. The user may also select multiple contacts from the adaptive list subset 904 by using known UI mechanisms. If several MMS/e-mail or other addresses are available for the selected contact(s), the user may select the correct address after selecting the recipient. Further, for new e-mail address entries into the text entry field 902, a portion of the address may be auto-completed after the contact name has been entered. For example, after entering First.Last@, one or more domain or operator addresses may be presented, such as "nokia.com," "abc.com," etc. The user can then select the appropriate one, or may continue entering text if the correct domain/operator address is not presented.

The adaptive lists in accordance with the present invention may also be used in connection with speech recognition technology used to identify intended communication recipients. Some current mobile communication devices, such as mobile phones, provide a feature to allow a user to associate a voice tag(s) with a particular contact name and type. For example, "John Smith" may have a home telephone number and a mobile phone number associated with his contact name in the user's contact list. The user may record a voice tag such as "John Smith home," and when the user states this phrase after invoking the speech recognition application, the home phone number associated with the contact "John Smith" will be dialed. Similarly, the user may record a voice tag such as "John Smith mobile" which will dial John Smith's mobile phone when the user utters this phrase when the speech recognition module is invoked. Other speech recognition systems such as Speaker Independent Name Dialler (SIND) allow the user to state a voice command which is matched against stored contacts, without the user first recording a voice tag.

However, the accuracy of speaker independent voice dialing is not flawless. For example, such speech recognition systems are particularly useful for users when keystroke or other UI manipulations are difficult or inconvenient, such as when the user is in his or her automobile. However, the automobile environment can be noisy, making voice recognition tasks difficult and more prone to errors. In accordance with one embodiment of the present invention, the accuracy of voice commands may be increased by utilizing adaptive list information and/or other previous usage of the terminal.

More particularly, one embodiment of the present invention involves the user of an adaptive list engine for use in improving the accuracy of voice recognition, such as in the case of voice-based dialing. Because speech recognition is not perfect, as well as other reasons such as multiple contacts sharing a common name, a voice recognition result may contain several possible matches. In accordance with one embodiment of the invention, the adaptive list engine may be used to prioritize these possible matches.

In accordance with one embodiment, voice-based dialing is therefore logged via the adaptive list engine. Based on weighting factors and/or context-awareness factors as previously described, the various possible matches of a voice entry may be presented to the user in an order that is the most likely to match the user's intended recipient. Thus, in a voice-based embodiment of the invention, the "presentation" of an adaptive recipient history list corresponds to an ordered list of possible matches of the voice entry, ordered from the most likely result to the least likely result.

As a representative example, assume that the local contact list of a mobile device user includes two similar contacts: 1) John Drake; and 2) Jon Blake. Due to imperfections in speech recognition technology, noisy environments, careless user enunciation and/or other reasons, the user's voice entry of "John Drake" may not be conclusively determined to be John Drake, but rather may be determined to be either John Drake or Jon Blake. Also assume that weighting factors are used, where the frequency of incoming and outgoing communications with contacts is at least one primary consideration in determining the adaptive recipient history list. If the frequency of communications with "John Drake" is greater than the frequency of communications with "Jon Blake," the resulting adaptive recipient history list is in the order of 1) John Drake, and 2) Jon Blake. An audible and/or visual confirmation of the user's voice entry may then be presented to the user in that order, thereby presenting the most likely or most popular contact to the user first. In this manner, the user is more likely to be presented with the contact that was intended.

In another embodiment, the frequency, recency or other factors may be combined with voice recognition results. For example, the voice recognition may provide "probabilities" for potential spoken contact entries. In the example using John Drake and John Blake, both probabilities may be high enough or otherwise close enough to one another that it cannot be determined with sufficient certainty which one was intended even though one may have a higher probability. In one embodiment, the probability order of the voice-recognition results may be reversed where the frequency (or recency, or other factors) of a first contact having the lower voice-recognition probability is sufficiently larger than the second contact.

Frequency, recency, and/or other weighting factors and context-awareness factors may be used similarly to that described above. These factors may be used exclusively in determining the order of the presentation of multiple result possibilities, or may be used in connection with likelihoods presented by the speech recognition feature itself. For example, the speech recognition system may determine that the user's voice entry is one of three possibilities, with "Jon Blake" being the most probable match. When combined with the weighting and/or context-awareness factors of the adaptive recipient history list, it may be concluded that "John Drake" is the most probable, thereby resulting in the presentation of an audible and/or visual confirmation placing John Drake first on the list of possible results. For example, the adaptive list engine may provide "scores" to be utilized as prior information on the popularity of matched contacts. These scores can be combined with the voice recognition results, such as by multiplying the probability (or other measure of the voice recognition results) of a match resulting from the voice recognition with the score provided by the adaptive list engine. The resulting measure can be used in ranking the matches. In another embodiment, appropriate scaling may be implemented to increase or decrease the weight of the prior information prior to such multiplication. Other embodiments involve passing a list of matches from the speech recognition application to the adaptive list engine, and/or passing adaptive recipient history list items to the speech recognition system. Various representative cooperative speech recognition/adaptive recipient history list embodiments are described more fully below.

Figure 10A:
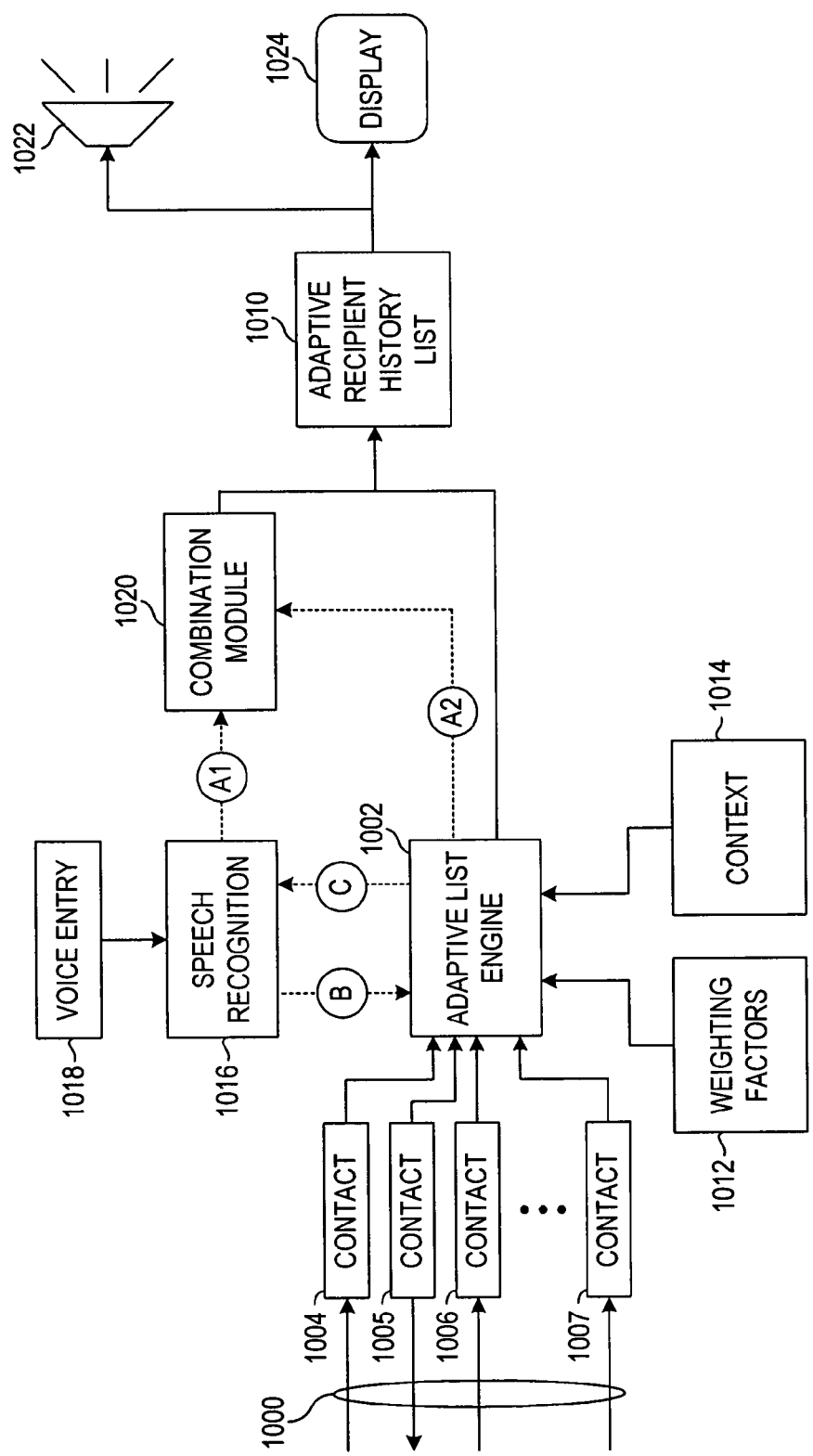
FIG. 10A is a block diagram of a representative embodiment of a manner for providing one or more adaptive recipient history lists in a system employing speech recognition functionality.

FIG. 10A is a block diagram of a representative embodiment of a manner for providing one or more adaptive recipient history lists in a system employing speech recognition functionality. As previously described, various communications 1000 may be sent and received at an adaptive list engine 1002 associated with a mobile device or other communicating terminal. These communications 1000 are associated with respective contacts 1004-1007, as each communication 1000 is received from or sent to a device associated with a contact address. The contact addresses associated with the sent and/or received communications 1000 are processed by the adaptive list engine 1002 in order to generate one or more adaptive recipient history lists 1010. As previously described, weighting factors 1012 and/or the context 1014 may be used by an adaptive list engine 1002 as input to the generation of the adaptive recipient history list 1010 by the adaptive list engine 1002.

In the illustrated embodiment, the mobile device/terminal also includes a speech recognition module 1016 to receive voice commands from the user via the voice entry 1018 UI. For example, the user may speak a contact name, address, or other identifier that is processed by the speech recognition module 1016. In accordance with one embodiment of the invention, the results of the speech recognition module 1016 may be processed in connection with results from the adaptive list engine 1002 in order to identify the most likely result(s) spoken by the user.

In one embodiment, the adaptive list engine 1002 a ranking or score of the contacts 1004-1007 based on predetermined processing conditions such as the weighting factors 1012 and/or the context 1014. Additionally, the speech recognition system 1016 may provide multiple results based on the voice entry 1018. In one embodiment, the scores from the adaptive list engine 1002 and the results from the speech recognition module 1016 are combined as depicted by paths A1 and A2 to the combination module 1020. The combination module 1020 may be implemented using a processor or other hardware, firmware, and/or software. This combination considers both the results from the speech recognition module, and formulates a result that may be manifested in the form of the adaptive recipient history list 1010. The results may be presented audibly via a speaker 1022 or other audio means, and/or via a visual display 1024.

The manner in which results from the speech recognition module 1016 and the adaptive list engine 1002 are combined may vary from implementation to implementation. In one embodiment, the scores from the adaptive list engine 1002 and the results from the speech recognition module 1016 may be combined by multiplying the probability of a match resulting from the speech recognition module 1016 with the score provided by the adaptive list engine 1002. The resulting measure may be used in ranking the matches, where this rank may be provided via an audio and/or visual adaptive recipient history list 1010, or in another manner in which such a ranking may be provided. Prior to multiplying in this fashion, the weight of the prior information processed by the adaptive list engine 1002 may be appropriately scaled to increase/decrease the weight of the prior information.

Another embodiment involving the speech recognition module 1016 which cooperatively uses the results of the adaptive list engine 1002 involves passing results from the speech recognition module 1016 to the adaptive list engine 1002, as depicted by path B. In other words, those possible matches of the speech recognition module 1016 are passed to the adaptive list engine 1002 to determine whether any one or more of the possible matches from the speech recognition module 1016 are associated with an existing one or more adaptive recipient history lists. In one embodiment, only those contacts that are ranked highly by the adaptive list engine 1002 are presented to the end user. In this manner, the number of matches narrows down, and in general the probability of presenting the correct match to the user increases.

In yet another embodiment involving the cooperation of the speech recognition module 1016 and the adaptive list engine 1002, a list of the most popular identifiers (e.g., names, addresses) is queried from the adaptive list engine 1002, and the matching is then performed only for the most popular identifiers. The response by the adaptive list engine 1002 is depicted on path C, where at least some of the contact identifiers that are associated with one or more of the adaptive recipient history lists 1010 are provided to the speech recognition module 1016. In one embodiment, any ambiguity in the speech recognition is resolved first by the most "popular" contact identifiers (e.g., based on weighting factors, context, etc.). In another embodiment, only those items resulting from the adaptive list engine 1002 will be considered for speech recognition, such that only "popular" contacts will be available for voice entry. This approach can improve the accuracy of the recognition, as well as expedite the recognition function since the number of matched items is smaller.

Figure 10B:
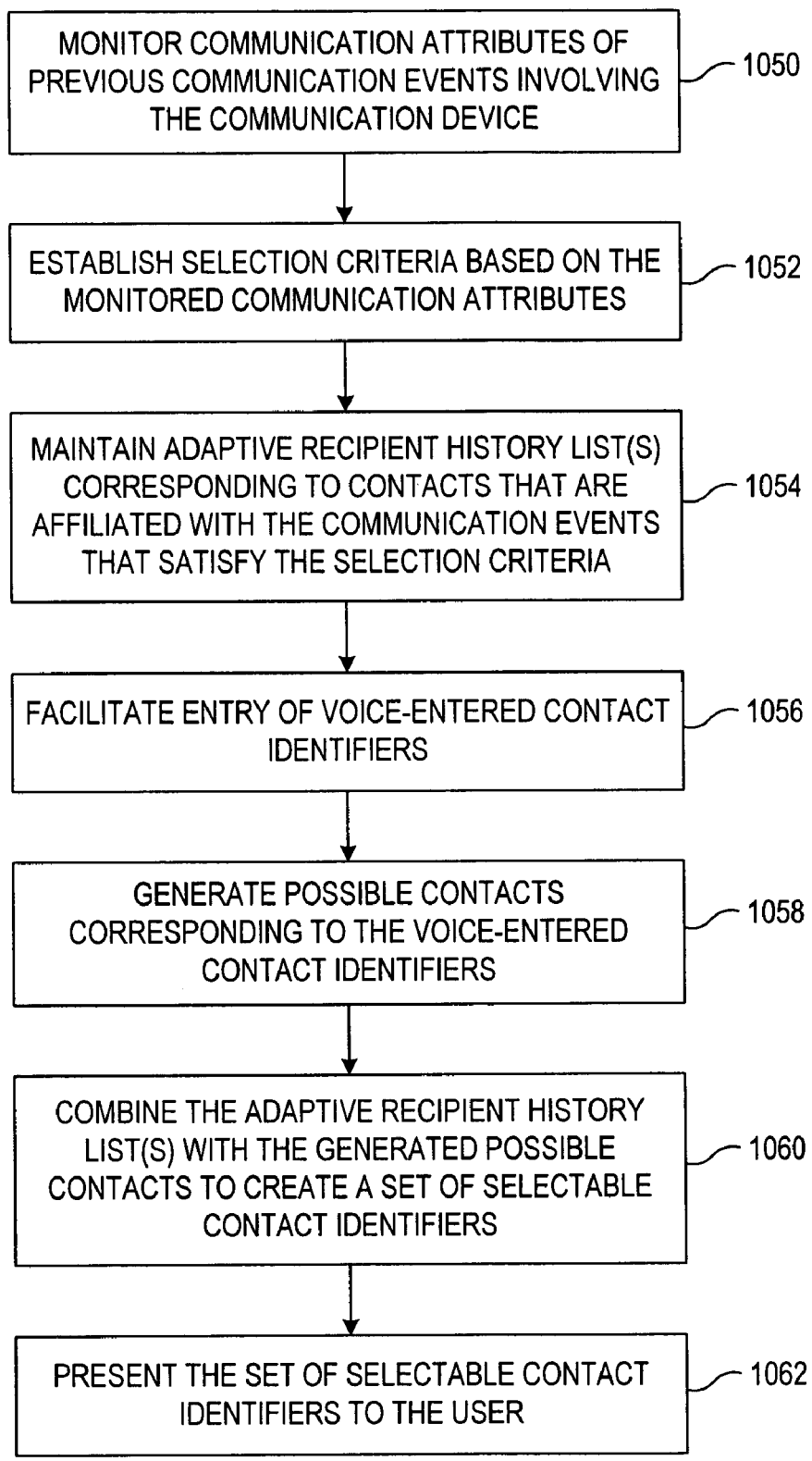
FIG. 10B illustrates an embodiment whereby relevant contact identifiers are determined from both an adaptive recipient history list(s) and speech recognition results.

Thus, the present invention includes an embodiment whereby relevant contact identifiers are determined from both an adaptive recipient history list(s) and speech recognition results. This is depicted in FIG. 10B. More particularly, communication attributes of previous communication events involving the communication device may be monitored 1050, and selection criteria such as weighting factors and/or the context are established 1052 based on the monitored communication attributes. For example, the communication attributes may include the contact identifiers, whether the communication is incoming or outgoing, communication types (e.g., SMS, MMS, voice), and the like. As previously described, weighting factors may be established based on such attributes. Further, the context in which the communications were made may also be used as selection criteria. One or more adaptive recipient history lists corresponding to the contacts that are affiliated with the communication events satisfying the selection criteria are maintained 1054. In addition to maintaining adaptive recipient history lists, entry of voice-entered contact identifiers is facilitated 1056. Speech recognition results are generated 1058, and the adaptive recipient history list(s) may then be combined 1060 with the generated possible contacts to create a set of selectable contact identifiers, which are then presented 1062 to the user to allow the user to select the intended recipient(s) of a current communication. As previously indicated, this presentation may involve an audio and/or visual presentation to the user.

Figure 11:
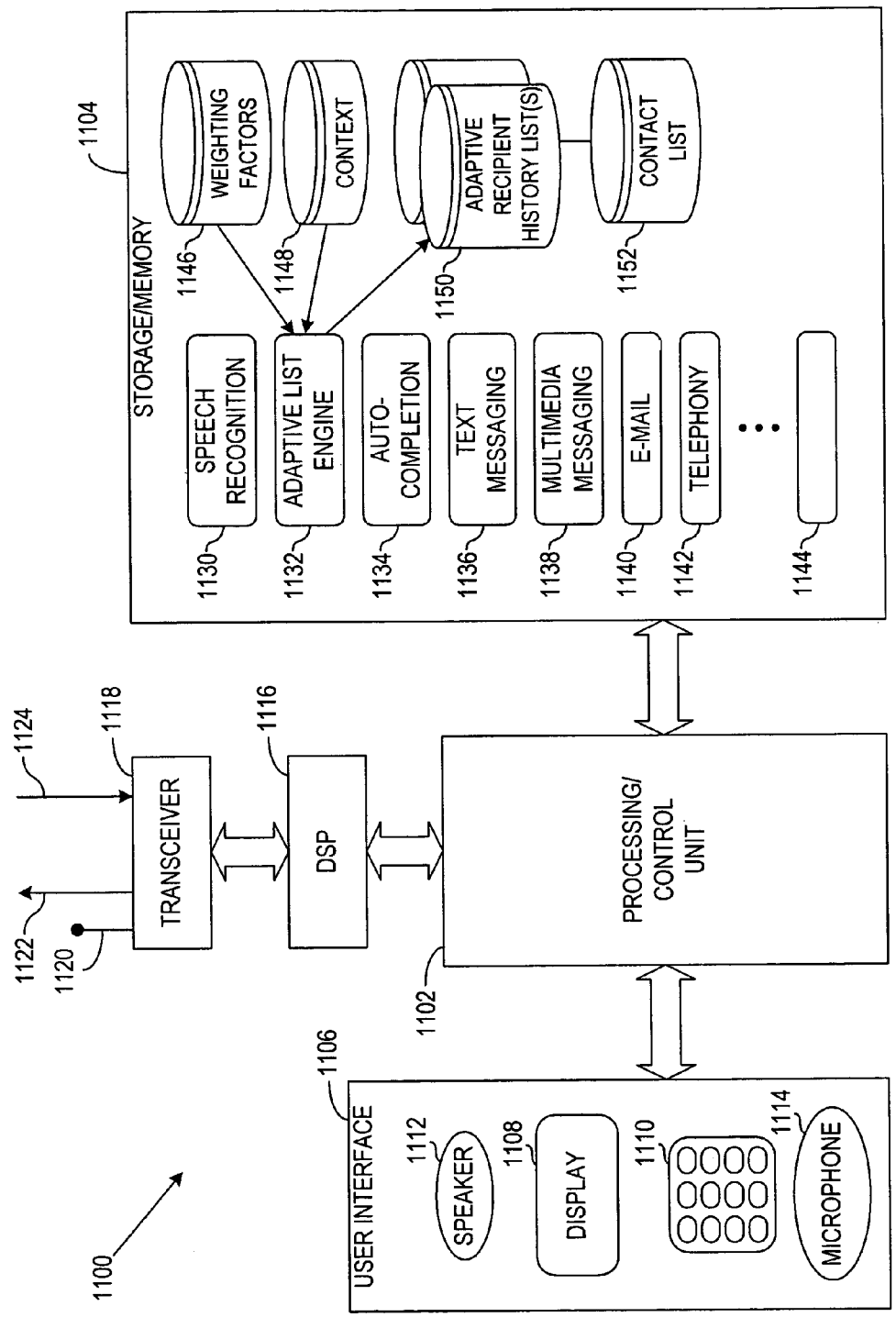
FIG. 11 illustrates a representative example of a mobile device in which the present invention may be implemented.

Hardware, firmware, software or a combination thereof may be used to perform the functions and operations in accordance with the invention. The mobile devices in accordance with the invention include communication devices such as, for example, mobile phones, PDAs, and other wireless communicators, as well as landline computing systems and communicators. A representative example of a mobile device in which the present invention may be implemented is illustrated in FIG. 11. The mobile device 1100 utilizes computing systems to control and manage the conventional device activity as well as the functionality provided by the present invention. The representative mobile device 1100 includes a computing system capable of carrying out operations in accordance with the invention. For example, the representative mobile device 1100 includes a processing/control unit 1102, such as a microprocessor, reduced instruction set computer (RISC), or other central processing module. The processing unit 1102 need not be a single device, and may include one or more processors. For example, the processing unit may include a master processor and associated slave processors coupled to communicate with the master processor.

The processing unit 1102 controls the basic functions of the mobile device 1100 as dictated by programs available in the program storage/memory 1104. The storage/memory 1104 may include an operating system and various program and data modules associated with the present invention. In one embodiment of the invention, the programs are stored in non-volatile electrically-erasable, programmable read-only memory (EEPROM), flash ROM, etc., so that the programs are not lost upon power down of the mobile device. The storage 1104 may also include one or more of other types of read-only memory (ROM) and programmable and/or erasable ROM, random access memory (RAM), subscriber interface module (SIM), wireless interface module (WIM), smart card, or other fixed or removable memory device. The relevant software for carrying out mobile device operations in accordance with the present invention may also be transmitted to the mobile device 1100 via data signals, such as being downloaded electronically via one or more networks, such as the Internet and an intermediate wireless network(s).

For performing other standard mobile device functions, the processor 1102 is also coupled to user-interface (UI) 1106 associated with the mobile device 1100. The UI 1106 may include, for example, a display 1108 such as a liquid crystal display, a keypad 1110, speaker 1112, and microphone 1114. These and other UI components are coupled to the processor 1102 as is known in the art. The keypad 1110 may include alpha-numeric keys for performing a variety of functions, including dialing numbers, navigating through graphical UI screens, etc. Other UI mechanisms may be employed, such as voice commands, switches, touch pad/screen, graphical user interface using a pointing device, trackball, joystick, or any other user interface mechanism.

The wireless device 1100 may also include conventional circuitry for performing wireless transmissions over the mobile network. The DSP 1116 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 1118, generally coupled to an antenna 1120, transmits the outgoing radio signals 1122 and receives the incoming radio signals 1124 associated with the mobile device 1100.

In the illustrated embodiment, the storage/memory 1104 stores the various client programs or user agents (UA) involved in facilitating the various adaptive lists in accordance with the present invention. For example, the storage 1104 may include various program modules, such as the speech recognition module 1130, adaptive list engine 1132, and auto-completion module 1134. Communication program modules may also be provided, such as a text messaging (e.g., SMS) module 1136, multimedia messaging (e.g., MMS) module 1138, e-mail module 1140, telephony module 1142, and/or other program modules 1144. The storage/memory 1104 may also store the data used in connection with the present invention, such as the weighting factors 1146, context parameters 1148, the adaptive recipient history list(s) 1150, and standard contact list 1152. These program modules and data are used as previously described.

Figure 12:
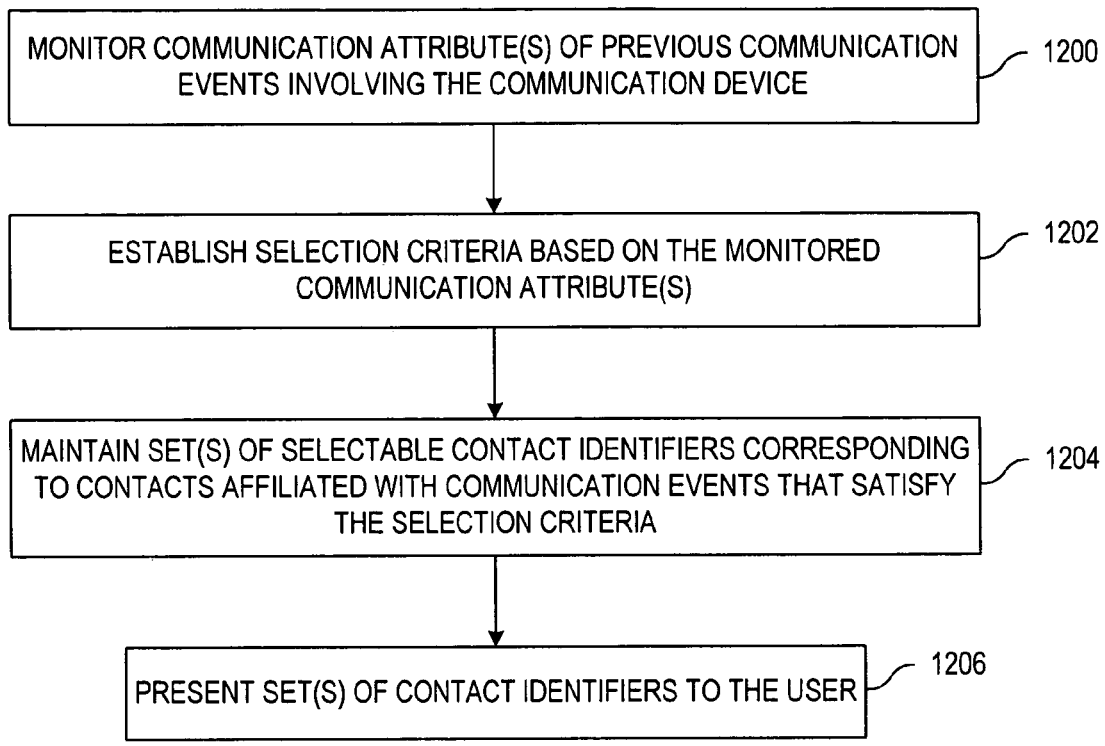
FIG. 12 illustrates one embodiment of a method in which a relevant list of contacts may be presented to the user, to facilitate user selection of an intended recipient(s) of a current communication.

As set forth above, the present invention provides a manner of creating one or more adaptive lists of relevant contacts in which the user is more likely to initiate a communication. FIG. 12 illustrates one embodiment of a method in which such a relevant list of contacts may be presented to the user, to facilitate user selection of an intended recipient(s) of a current communication. One or more communication attributes of previous communication events involving the communication device are monitored 1200. These communication attributes may include any attribute of the communication events. For example, the communication events include, but are not limited to, incoming and outgoing voice or other audio communications, as well as incoming and outgoing text and/or multimedia communications. The communication attributes may include, for example, whether the communication is incoming or outgoing, the total number of communication events with a particular contact, the relative time that has elapsed since the communication event occurred, and the like. One or more of such communication attributes relating to the communication events are monitored in accordance with one embodiment of the invention.

Based on these monitored communication attributes, selection criteria such as the weighting factors may be established 1202. For example, one selection criteria may be the frequency in which a particular contact has been in communication with the user's communication device. Such a selection criteria may be based on the number of monitored communication events with the particular contact. This number of monitored communication events may relate to the number of communication events between the particular contact and the user over all time, or over a predetermined time period. The number may also be based on the particular communication type, such as the number of text messaging communications. Another example of selection criteria based on the monitored communication attributes is the recency of the communication events, which represents criteria based on the relative time that has elapsed since the communication event occurred. Thus, any desired weighting factor or other selection criteria may be maintained based on the particular communication attributes that are monitored.

A set(s) of selectable contact identifiers, e.g., an adaptive recipient history list(s), may then be maintained 1204. The selectable contact identifiers are associated with the communication events that satisfy the particular selection criteria. Because the communication attributes may change over time, the adaptive recipient history list(s) will also change or "adapt" the changing conditions. For example, if one criteria is the frequency in which particular contacts have been in communication with the user via SMS messaging, a set of contacts may be adaptably maintained that lists the contact identifiers of the contacts exhibiting the highest SMS message count with the user. As another example, if one selection criteria is the recency in which particular contacts have been in communication with the user via any type of communication, a set of contacts may be adaptably maintained that lists the contact identifiers associated with contacts most recently in any type of communication with the user.

When the adaptive list(s) have been created, one or more of the adaptive lists may be presented 1206 to the user via the communication device. This presentation may be via visual and/or audio presentation or otherwise. The adaptive lists provide selectable contact identifiers from which the user may select as a recipient(s) of a current communication.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices, thereby making a computer program product or article of manufacture according to the invention. As such, the terms "computer-readable medium," "computer program product" or analogous terminology as used herein are intended to encompass a computer program existent temporarily or permanently on any computer-usable medium such as on any memory device.

Memory devices on which such program code may be stored include, but are not limited to, fixed or hard disk drives, diskettes, optical disks, CD-ROMs, DVDs, magnetic tape, semiconductor memories such as RAM, ROM, PROMS, SIMs, WIMs, etc. Transmitting systems include, but are not limited to, the Internet or other Global Area Networks (GANs), intranets, electronic bulletin board and message/note exchanges; telephone/modem-based network communication, hard-wired/cabled communication network, cellular communication, radio wave communication, satellite communication, and other stationary or mobile network systems/communication links.

One skilled in the art will readily appreciate the manners in which software/firmware as described herein may be combined with the appropriate general and/or special purpose computer hardware to create a computing system and/or computing subcomponents embodying the invention, and to create a computing system and/or computing subcomponents for carrying out methods of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method comprising:
   monitoring one or more communication attributes of previous communication events involving device-to-device communications between a user of a communication device and other device users;
   determining a frequency of the communication events based on the monitored communication attributes for each of the contacts that are affiliated with the communication events;

maintaining one or more sets of selectable contact identifiers corresponding to the other device users that are affiliated with the determined frequency of the communication events; and presenting at least one of the sets of selectable contact identifiers of the other device users to the user via the communication device.

2. The method of claim 1, further comprising facilitating user selection of one or more of the contact identifiers presented via a user interface of the communication device.

3. The method of claim 2, further comprising directing at least one current communication to the contacts corresponding to the one or more contact identifiers selected by the user.

4. The method of claim 1, wherein the monitored communication attributes comprise any one or more of a contact identifier, an incoming communication indication, an outgoing communication indication, a communication type, a communication duration, a message type, or a time elapsed from one or more previous communications.

5. The method of claim 4, wherein the communication type includes any one or more of a voice communication or a messaging communication.

6. The method of claim 5, wherein the messaging communication comprises any one or more of a text message, a multimedia message, or an e-mail message.

7. The method of claim 1, wherein:

maintaining one or more sets of selectable contact identifiers comprises maintaining one or more adaptive recipient history lists corresponding to the contacts that are affiliated with the communication events that correspond to the determined frequency.

8. The method of claim 1, wherein determining a frequency of the communication events comprises determining a frequency of the communication events directed from the contacts to the communication device.

9. The method of claim 1, wherein determining a frequency of the communication events comprises determining a frequency of the communication events directed from the communication device to the contacts.

10. The method of claim 1, wherein determining a frequency of the communication events comprises determining a frequency of the communication events directed either from the communication device to the contacts or from the contacts to the communication device.

11. The method of claim 7, wherein:

determining a frequency of the communication events comprises determining a frequency of the communication events of one or more particular communication types; and maintaining one or more adaptive recipient history lists comprises maintaining a plurality of the adaptive recipient history lists to respectively correspond to the one or more particular communication types.

12. The method of claim 11, wherein the communication types comprise any one or more of a voice communication, text message, multimedia message, and e-mail message.

13. The method of claim 1, wherein determining a frequency of the communication events comprises determining a frequency of the communication events occurring within a time period for each of the contacts that are affiliated with the communication events.

14. The method of claim 1, further comprising:

establishing one or more weighting factors by determining a recency and the frequency of the communication events for each of the contacts that are affiliated with the communication events; and maintaining one or more sets of selectable contact identifiers comprises maintaining one or more adaptive recipient history lists corresponding to the contacts that are affiliated with the communication events that correspond to the specified frequency and recency.

15. The method of claim 1, wherein presenting at least one of the sets of selectable contact identifiers comprises presenting the at least one of the sets of selectable contact identifiers in response to a user request for presentation of the at least one of the sets of selectable contact identifiers.

16. The method of claim 1, wherein presenting at least one of the sets of selectable contact identifiers comprises presenting the at least one of the sets of selectable contact identifiers in response to invoking a communication application via the communication device.

17. The method of claim 16, wherein presenting the at least one of the sets of selectable contact identifiers in response to invoking a communication application comprises presenting the set of selectable contact identifiers corresponding to the communication type of the invoked communication application.

18. The method of claim 1, further comprising presenting a link to a contact database if the selectable contact identifier for an intended communication recipient is not presented via the presented set of selectable contact identifiers.

19. The method of claim 1, further comprising:

facilitating user entry of at least a portion of a contact identifier via a user interface; and utilizing the one or more sets of selectable contact identifiers as a basis for auto-completion of the user entry of the contact identifier.

20. The method of claim 19, wherein utilizing the one or more sets of selectable contact identifiers as the basis for auto-completion completion comprises:

presenting at least one of the sets of selectable contact identifiers to the user; and eliminating from the presentation the selectable contact identifiers that do not match the portion of the contact identifier entered by the user.

21. The method of claim 20, wherein facilitating user entry of at least a portion of a contact identifier and presenting at least one of the sets of selectable contact identifiers comprises facilitating the user entry and presenting the at least one of the sets of selectable contact identifiers via an idle screen of the communication device.

22. The method of claim 20, wherein facilitating user entry of at least a portion of a contact identifier and presenting at least one of the sets of selectable contact identifiers comprises facilitating the user entry and presenting the at least one of the sets of selectable contact identifiers via a communication application of the communication device.

23. The method of claim 22, wherein facilitating user entry of at least a portion of the contact identifier comprises facilitating user entry of at least a portion of the contact identifier into a "To" field of a user interface to the communication application.

24. The method of claim 23, wherein the communication application comprises any of a text messaging application, a multimedia messaging application, an e-mail application, or a telephony application.

25. The method of claim 1, wherein presenting at least one of the sets of selectable contact identifiers comprises presenting a perceivable portion of the at least one set of selectable contact identifiers to the user via the communication device.

26. The method of claim 1, wherein presenting at least one of the sets of selectable contact identifiers comprises presenting all of the at least one set of selectable contact identifiers to the user via the communication device.

27. A method comprising:
monitoring one or more communication attributes of previous communication events involving device-to-device communications between a user of a communication device;
determining a frequency of the communication events based on the monitored communication attributes for each of the contacts that are affiliated with the communication events;
maintaining one or more sets of contact identifiers of the other device users involved in the communication events based on the frequency of the communication events;
facilitating entry of voice-entered contact identifiers;
generating a plurality of possible contacts corresponding to the voice-entered contact identifiers; and
combining at least one of the sets of contact identifiers with the generated plurality of possible contacts to create a set of selectable contact identifiers; and
presenting at least a portion of the set of selectable contact identifiers of the other device users to the user via the communication device.

28. The method of claim 27, wherein combining at least one of the sets of contact identifiers with the generated plurality of possible contacts comprises applying the set of contact identifiers to the generated plurality of possible contacts to reduce the generated plurality of possible contacts to those matching the applied set of contact identifiers.

29. The method of claim 27, wherein combining at least one of the sets of contact identifiers with the generated plurality of possible contacts comprises applying the generated plurality of possible contacts to the set of contact identifiers to reduce the set of contact identifiers to those matching the generated plurality of possible contacts.

30. The method of claim 27, wherein combining at least one of the sets of contact identifiers with the generated plurality of possible contacts comprises generating the plurality of possible contacts from only the set of contact identifiers.

31. The method of claim 27, wherein presenting at least a portion of the set of selectable contact identifiers comprises audibly presenting at least a portion of the set of selectable contact identifiers.

32. The method of claim 27, wherein presenting at least a portion of the set of selectable contact identifiers comprises audibly presenting at least a portion of the set of selectable contact identifiers in an order dictated by the one or more sets of contact identifiers.

33. An apparatus comprising:
a memory to store selection criteria including one or more frequencies in which communication events occur;
an adaptive list engine configured to monitor at least the frequency of the communication events involving device-to-device communications between a user of the apparatus and other device users, and to maintain one or more adaptive lists of contact identifiers of the other device users involved in the communication events occurring at one or more of the monitored frequencies; and
a user interface to present at least a portion of one or more of the adaptive lists of contact identifiers to the user, and to facilitate user selection of one or more of the contact identifiers in the presented adaptive lists as intended recipients of a current communication.

34. The aparatus as in claim 33, wherein the communication events involving the communication device comprise communications directed to or initiated from the communication device.

35. The aparatus as in claim 33, wherein the adaptive list engine comprises a processor executing instructions configured to monitor the frequency of the communication events, and to maintain the one or more adaptive lists of contact identifiers corresponding to the contacts that are affiliated with the communication events occurring at the one or more of the monitored frequencies.

36. The aparatus as in claim 33, further comprising:
a speech recognition module to receive voice-entered contact identifiers and to generate a plurality of possible contacts corresponding to the voice-entered contact identifiers; and
a combination module coupled to the speech recognition module and to the adaptive list engine to combine at least one of the adaptive lists with the generated plurality of possible contacts to create a set of selectable contact identifiers.

37. The apparatus as in claim 33, further comprising a speech recognition module to receive voice-entered contact identifiers and to generate a plurality of possible contacts corresponding to the voice-entered contact identifiers, wherein the speech recognition module is coupled to the adaptive list engine to receive the one or more adaptive lists and to modify the plurality of possible contacts based on the one or more adaptive lists.

38. The aparatus as in claim 33, further comprising a speech recognition module to receive voice-entered contact identifiers and to generate a plurality of possible contacts corresponding to the voice-entered contact identifiers, wherein the adaptive list engine is coupled to the speech recognition module to receive the plurality of possible contacts and to modify the one or more adaptive lists based on the plurality of possible contacts provided by the speech recognition module.

39. A computer-readable medium having instructions stored thereon which are executable by a computer system to perform steps comprising:
monitoring one or more communication attributes of previous communication events involving device-to-device communications between a user of a communication device and other device users;
determining a frequency of the communication events based on the monitored communication attributes for each of the contacts that are affiliated with the communication events;
maintaining one or more sets of selectable contact identifiers corresponding to the other device users that are affiliated with the determined frequency of the communication events; and
presenting at least a portion of at least one of the sets of selectable contact identifiers of the other device users to the user via a user interface.

40. A computer-readable medium having instructions stored thereon which are executable by a computer system to perform steps comprising:
monitoring one or more communication attributes of previous communication events involving device-to-device communications between a user of a communication device;
determining a frequency of the communication events based on the monitored communication attributes for each of the contacts that are affiliated with the communication events;

maintaining one or more sets of contact identifiers of the other device users involved in the communication events based on the frequency of the communication events;

facilitating entry of voice-entered contact identifiers;

generating a plurality of possible contacts corresponding to the voice-entered contact identifiers;

combining at least one of the sets of contact identifiers with the generated plurality of possible contacts to create a set of selectable contact identifiers; and presenting at least a portion of the set of selectable contact identifiers of the other device users to the user via a user interface.

41. A communication device comprising:

means for monitoring one or more communication attributes of previous communication events involving device-to-device communications between a user of the communication device and other device users;

means for determining a frequency of the communication events based on the monitored communication attributes for each of the contacts that are affiliated with the communication events;

means for maintaining one or more sets of selectable contact identifiers corresponding to the other device users that are affiliated with the determined frequency of the communication events; and a user interface to present at least a portion of at least one of the sets of selectable contact identifiers of the other device users to the user.

* * * * *